US010527225B2

(12) United States Patent
Pratt et al.

(10) Patent No.: US 10,527,225 B2
(45) Date of Patent: Jan. 7, 2020

(54) FRAME AND LENS UPGRADE KITS FOR LIGHTING FIXTURES

(71) Applicant: CREE, INC., Durham, NC (US)

(72) Inventors: S. Scott Pratt, Cary, NC (US); Nathan Snell, Raleigh, NC (US); Nicholas W. Medendorp, Jr., Raleigh, NC (US)

(73) Assignee: IDEAL INDUSTRIES, LLC, Sycamore, IL (US)

( * ) Notice: Subject to any disclaimer, the term of this patent is extended or adjusted under 35 U.S.C. 154(b) by 229 days.

(21) Appl. No.: 14/225,327

(22) Filed: Mar. 25, 2014

(65) Prior Publication Data

US 2015/0276125 A1 Oct. 1, 2015

(51) Int. Cl.
*F21V 17/10* (2006.01)
*F16M 13/02* (2006.01)
*F21V 5/04* (2006.01)

(52) U.S. Cl.
CPC .......... *F16M 13/022* (2013.01); *F21V 5/048* (2013.01); *F21V 17/10* (2013.01)

(58) Field of Classification Search
CPC ........ F21S 8/026; F21V 15/01; F21V 21/048; F21V 21/04; F21V 21/041; F21V 21/047–049; F21V 17/10; F21V 17/18; F16M 13/022
USPC ........ 362/366; 248/472, 305, 692, 690, 339, 248/306, 304; 40/571, 549, 611.02, 40/611.01, 610, 732, 754, 750, 748
See application file for complete search history.

(56) References Cited

U.S. PATENT DOCUMENTS

D85,382 S 10/1931 Guth
2,187,870 A * 1/1940 Veccia ...................... G09F 1/14
40/610

(Continued)

FOREIGN PATENT DOCUMENTS

CN 1762061 4/2006
CN 1934389 3/2007

(Continued)

OTHER PUBLICATIONS

Office Action from U.S. Appl. No. 12/961,385, dated Nov. 27, 2015.

(Continued)

*Primary Examiner* — Julie A Bannan
(74) *Attorney, Agent, or Firm* — Ferguson Case Orr Paterson

(57) ABSTRACT

Frame and lens upgrade kits for lighting fixtures. A frame bracket defines the frame area, which can be rectangular, for example. A lens frame fits just inside the frame bracket with the lens frame being releasably attached thereto. The frame bracket can be constructed from collapsible frame bracket subassemblies. For example, a rectangular frame bracket may be assembled from first and second collapsible frame bracket subassemblies that fan out and lock together to create a rigid frame bracket. The subassemblies each comprise elongated side and edge brackets that are fastened together such that they can pivot about one another. In some embodiments, one side of the lens frame is attached to a corresponding side of the frame bracket with a rotatable clip that allows the lens frame to swing such that its other side can attach to the bracket frame with an attachment latch, which can be magnetic, for example.

4 Claims, 14 Drawing Sheets

(56) References Cited

U.S. PATENT DOCUMENTS

| | | | | |
|---|---|---|---|---|
| 2,356,654 | A | 8/1944 | Cullman | 200/84 C |
| 2,701,840 | A * | 2/1955 | Carlson | F21S 8/02 |
| | | | | 16/357 |
| 3,381,124 | A | 4/1968 | Eisenberg | 362/354 |
| 3,743,826 | A | 7/1973 | Halfaker | |
| 3,755,667 | A * | 8/1973 | Price | F21S 8/02 |
| | | | | 362/147 |
| 3,790,774 | A | 2/1974 | Miller | |
| 3,810,085 | A * | 5/1974 | Woloski | F21S 8/02 |
| | | | | 362/277 |
| 4,188,656 | A * | 2/1980 | Howard | F21V 21/04 |
| | | | | 362/365 |
| 4,325,197 | A * | 4/1982 | Achten | G09F 15/0006 |
| | | | | 40/607.1 |
| 4,939,627 | A | 7/1990 | Herst et al. | 362/299 |
| 5,025,356 | A | 6/1991 | Gawad | 362/221 |
| 5,483,779 | A * | 1/1996 | Crawford | G09F 15/00 |
| | | | | 135/151 |
| 5,526,190 | A | 6/1996 | Hubble, III | 347/102 |
| 5,823,663 | A | 10/1998 | Bell et al. | 362/362 |
| D407,473 | S | 3/1999 | Wimbock | |
| 6,079,851 | A | 6/2000 | Altman | |
| 6,102,550 | A | 8/2000 | Edwards, Jr. | |
| 6,149,283 | A | 11/2000 | Conway et al. | 362/236 |
| 6,155,699 | A | 12/2000 | Miller et al. | 362/293 |
| 6,210,025 | B1 * | 4/2001 | Schmidt | F21S 8/026 |
| | | | | 362/217.12 |
| 6,234,643 | B1 | 5/2001 | Lichon, Jr. | 362/147 |
| 6,402,347 | B1 | 6/2002 | Maas et al. | 362/294 |
| 6,523,974 | B2 | 2/2003 | Engel | 362/224 |
| 6,578,979 | B2 | 6/2003 | Truttmann-Battig | 362/92 |
| 6,598,998 | B2 | 7/2003 | West | 257/E33.073 |
| D496,121 | S | 9/2004 | Santoro | |
| 6,871,983 | B2 | 3/2005 | Jacob et al. | 362/364 |
| 6,948,838 | B2 | 9/2005 | Kunstler | 362/237 |
| 6,951,415 | B2 | 10/2005 | Amano | 362/297 |
| 7,021,797 | B2 | 4/2006 | Minano et al. | 362/355 |
| 7,049,761 | B2 | 5/2006 | Timmermans et al. | 315/246 |
| 7,063,449 | B2 | 6/2006 | Ward | 345/102 |
| 7,111,969 | B2 | 9/2006 | Bottesch | 362/299 |
| 7,175,296 | B2 | 2/2007 | Cok | 362/147 |
| 7,213,940 | B1 | 5/2007 | Van de Ven et al. | 362/231 |
| 7,217,004 | B2 | 5/2007 | Park | 362/364 |
| 7,237,924 | B2 | 7/2007 | Martineau et al. | 362/231 |
| D556,358 | S | 11/2007 | Santoro | |
| 7,338,182 | B1 | 3/2008 | Hastings et al. | 362/150 |
| 7,341,358 | B2 | 3/2008 | Hsieh | 362/97.1 |
| 7,510,299 | B2 | 3/2009 | Timmermans et al. | 362/225 |
| 7,520,636 | B2 | 4/2009 | Van Der Poel | 362/290 |
| D593,246 | S | 5/2009 | Fowler et al. | |
| 7,559,672 | B1 | 7/2009 | Parkyn et al. | 362/244 |
| 7,594,736 | B1 | 9/2009 | Kassay et al. | 362/225 |
| D604,446 | S | 11/2009 | Fowler et al. | |
| 7,614,767 | B2 | 11/2009 | Zulim | |
| 7,618,157 | B1 | 11/2009 | Galvez et al. | 362/294 |
| 7,618,160 | B2 | 11/2009 | Chinniah et al. | 362/326 |
| D608,932 | S | 1/2010 | Castelli | |
| 7,654,688 | B2 | 2/2010 | Li | |
| 7,654,702 | B1 | 2/2010 | Ding et al. | |
| 7,661,844 | B2 | 2/2010 | Sekiguchi et al. | 362/249.02 |
| D611,183 | S | 3/2010 | Duarte | |
| 7,674,005 | B2 | 3/2010 | Chung et al. | 362/223 |
| 7,686,470 | B2 | 3/2010 | Chiang | 362/147 |
| 7,686,484 | B2 * | 3/2010 | Heiking | F21S 8/026 |
| | | | | 362/374 |
| 7,712,918 | B2 | 5/2010 | Siemiet et al. | 362/241 |
| 7,722,220 | B2 | 5/2010 | Van de Ven | 362/294 |
| 7,722,227 | B2 | 5/2010 | Zhang et al. | 362/364 |
| D617,487 | S | 6/2010 | Fowler et al. | |
| 7,768,192 | B2 | 8/2010 | Van de Ven et al. | 313/503 |
| 7,815,338 | B2 | 10/2010 | Siemiet et al. | 362/218 |
| 7,824,056 | B2 | 11/2010 | Madireddi et al. | 362/125 |
| 7,828,468 | B2 | 11/2010 | Mayfield et al. | 362/342 |
| D633,247 | S | 2/2011 | Kong et al. | |
| 7,922,354 | B2 | 4/2011 | Everhart | 362/235 |
| 7,926,982 | B2 | 4/2011 | Liu | 362/294 |
| 7,959,332 | B2 | 6/2011 | Tickner | |
| 7,988,321 | B2 | 8/2011 | Wung et al. | 362/218 |
| 7,988,335 | B2 | 8/2011 | Liu et al. | 362/294 |
| 7,991,257 | B1 | 8/2011 | Coleman | 264/1.24 |
| 7,993,034 | B2 | 8/2011 | Wegner | 362/296.05 |
| 8,038,314 | B2 | 10/2011 | Ladewig | 362/147 |
| 8,038,321 | B1 | 10/2011 | Franck et al. | 362/249.02 |
| 8,058,659 | B2 | 11/2011 | Bisberg | |
| 8,070,326 | B2 | 12/2011 | Lee | 362/367 |
| D653,376 | S | 1/2012 | Kong et al. | |
| 8,092,043 | B2 | 1/2012 | Lin et al. | 362/249.02 |
| 8,092,049 | B2 | 1/2012 | Kinnune et al. | 362/294 |
| 8,096,671 | B1 | 1/2012 | Cronk | 362/147 |
| D657,488 | S | 4/2012 | Lown et al. | |
| 8,162,504 | B2 | 4/2012 | Zhang et al. | 362/217 |
| 8,186,855 | B2 | 5/2012 | Wassel et al. | 362/373 |
| 8,197,086 | B2 | 6/2012 | Watanabe et al. | 362/218 |
| 8,201,968 | B2 | 6/2012 | Maxik et al. | |
| 8,215,799 | B2 | 7/2012 | Vanden Eynden et al. | 362/294 |
| 8,246,219 | B2 | 8/2012 | Teng et al. | 362/217.02 |
| 8,256,927 | B2 | 9/2012 | Hu et al. | 362/294 |
| 8,287,160 | B2 | 10/2012 | Shen | |
| D670,849 | S | 11/2012 | Lay et al. | |
| 8,317,354 | B2 | 11/2012 | Gassner et al. | 362/147 |
| D676,848 | S | 2/2013 | Smith et al. | |
| 8,365,450 | B1 * | 2/2013 | Redmon | G03B 21/58 |
| | | | | 248/170 |
| 8,410,514 | B2 | 4/2013 | Kim | 257/99 |
| D684,291 | S | 6/2013 | Goelz et al. | |
| 8,523,383 | B1 | 9/2013 | Grigore | |
| 8,556,452 | B2 | 10/2013 | Simon et al. | 362/217.07 |
| 8,591,058 | B2 | 11/2013 | Concepcion | 362/231 |
| 8,591,071 | B2 | 11/2013 | Hochstein | 362/294 |
| 8,602,601 | B2 | 12/2013 | Khazi | |
| 8,616,723 | B2 | 12/2013 | Zhang et al. | 362/218 |
| D698,975 | S | 2/2014 | Blessit et al. | |
| 8,640,369 | B2 * | 2/2014 | Dysart | G09F 9/33 |
| | | | | 362/217.15 |
| 8,641,243 | B1 | 2/2014 | Rashidi | 362/373 |
| D701,988 | S | 4/2014 | Clements | |
| 8,696,154 | B2 | 4/2014 | Hutchens | 362/217.05 |
| 8,702,264 | B1 | 4/2014 | Rashidi | 362/147 |
| 8,764,244 | B2 | 7/2014 | Jeon | 362/218 |
| D714,988 | S | 10/2014 | Park et al. | |
| D721,198 | S | 1/2015 | Glasbrenner | |
| 9,010,956 | B1 | 4/2015 | Davis | |
| 9,052,057 | B2 * | 6/2015 | Stenhouse | F16M 11/041 |
| 9,052,075 | B2 | 6/2015 | Demuynck et al. | |
| 2003/0063476 | A1 | 4/2003 | English et al. | |
| 2004/0001344 | A1 | 1/2004 | Hecht | |
| 2004/0085779 | A1 | 5/2004 | Pond et al. | 362/516 |
| 2004/0100796 | A1 | 5/2004 | Ward | |
| 2004/0240230 | A1 | 12/2004 | Kitajima | 362/558 |
| 2005/0180135 | A1 | 8/2005 | Mayer | 362/240 |
| 2005/0264716 | A1 | 12/2005 | Kim et al. | |
| 2005/0281023 | A1 | 12/2005 | Gould | |
| 2006/0198127 | A1 * | 9/2006 | Lippis | E04B 9/0478 |
| | | | | 362/147 |
| 2006/0221611 | A1 | 10/2006 | No | 362/247 |
| 2006/0245208 | A1 | 11/2006 | Sakamoto | |
| 2006/0262521 | A1 | 11/2006 | Piepgras et al. | 362/149 |
| 2006/0279671 | A1 | 12/2006 | Han | |
| 2006/0291206 | A1 | 12/2006 | Angelini et al. | 362/244 |
| 2007/0070625 | A1 | 3/2007 | Bang | 362/240 |
| 2007/0109779 | A1 | 5/2007 | Sekiguchi et al. | |
| 2007/0211457 | A1 | 9/2007 | Mayfield et al. | 362/223 |
| 2007/0253205 | A1 | 11/2007 | Welker | 362/373 |
| 2007/0279910 | A1 | 12/2007 | Lin | |
| 2007/0297181 | A1 | 12/2007 | Mayfield et al. | 362/342 |
| 2008/0019147 | A1 | 1/2008 | Erchak | 362/607 |
| 2008/0037284 | A1 | 2/2008 | Rudisill | 362/629 |
| 2008/0049422 | A1 | 2/2008 | Trenchard et al. | 362/238 |
| 2008/0232093 | A1 | 9/2008 | Kim | 362/147 |
| 2008/0278943 | A1 | 11/2008 | Van der Poel | 362/240 |
| 2008/0303977 | A1 | 12/2008 | Sekiguchi | |
| 2009/0034247 | A1 | 2/2009 | Boyer | 362/225 |

(56) References Cited

U.S. PATENT DOCUMENTS

| | | | |
|---|---|---|---|
| 2009/0073693 A1 | 3/2009 | Nall | 362/249.02 |
| 2009/0161356 A1 | 6/2009 | Negley et al. | 362/231 |
| 2009/0168439 A1 | 7/2009 | Chiang | 362/404 |
| 2009/0196024 A1 | 8/2009 | Heiking et al. | 362/150 |
| 2009/0237958 A1 | 9/2009 | Kim | |
| 2009/0262543 A1 | 10/2009 | Ho | 362/373 |
| 2009/0296388 A1 | 12/2009 | Wu et al. | 362/235 |
| 2009/0310354 A1 | 12/2009 | Zampini et al. | 362/235 |
| 2010/0039579 A1 | 2/2010 | Park | |
| 2010/0061108 A1 | 3/2010 | Zhang et al. | 362/364 |
| 2010/0097794 A1 | 4/2010 | Teng et al. | 362/231 |
| 2010/0103678 A1 | 4/2010 | Van De Ven et al. | 362/294 |
| 2010/0110679 A1 | 5/2010 | Teng et al. | |
| 2010/0142202 A1* | 6/2010 | Sugishita | F21S 8/026 362/235 |
| 2010/0172133 A1 | 7/2010 | Liu | 362/235 |
| 2010/0177514 A1 | 7/2010 | Liu | |
| 2010/0177532 A1 | 7/2010 | Simon et al. | 362/555 |
| 2010/0188609 A1 | 7/2010 | Matsuki et al. | |
| 2010/0253591 A1 | 10/2010 | Hwu et al. | 345/1.3 |
| 2010/0254128 A1 | 10/2010 | Pickard et al. | 362/231 |
| 2010/0254145 A1 | 10/2010 | Yamaguchi | |
| 2010/0254146 A1 | 10/2010 | McCanless | |
| 2010/0270903 A1 | 10/2010 | Jao et al. | 313/46 |
| 2010/0271843 A1 | 10/2010 | Holten et al. | 362/609 |
| 2010/0277905 A1 | 11/2010 | Janik et al. | 362/235 |
| 2010/0277934 A1 | 11/2010 | Oquendo, Jr. | 362/433 |
| 2010/0295468 A1 | 11/2010 | Pedersen et al. | 315/294 |
| 2010/0302778 A1 | 12/2010 | Dabiet | |
| 2010/0327768 A1 | 12/2010 | Kong et al. | 315/294 |
| 2011/0032714 A1 | 2/2011 | Chang | 362/373 |
| 2011/0043132 A1 | 2/2011 | Kim et al. | |
| 2011/0141722 A1 | 6/2011 | Acampora et al. | 362/218 |
| 2011/0141734 A1 | 6/2011 | Li | 362/235 |
| 2011/0156584 A1 | 6/2011 | Kim | 315/32 |
| 2011/0164417 A1 | 7/2011 | Huang | 362/235 |
| 2011/0175533 A1 | 7/2011 | Homan | 315/130 |
| 2011/0199005 A1 | 8/2011 | Bretschneider et al. | |
| 2011/0199769 A1 | 8/2011 | Bretschneider et al. | |
| 2011/0222291 A1 | 9/2011 | Peng | |
| 2011/0246146 A1 | 10/2011 | Kauffman et al. | 703/2 |
| 2011/0255292 A1 | 10/2011 | Shen | 362/311 |
| 2011/0267810 A1 | 11/2011 | Higman et al. | 362/218 |
| 2011/0267823 A1 | 11/2011 | Angelini et al. | 362/277 |
| 2011/0286225 A1 | 11/2011 | Konishi | |
| 2011/0305024 A1 | 12/2011 | Chang | 362/254 |
| 2012/0033420 A1 | 2/2012 | Kim et al. | 362/235 |
| 2012/0038289 A1 | 2/2012 | Jee et al. | 315/291 |
| 2012/0051041 A1 | 3/2012 | Edmond et al. | 362/231 |
| 2012/0120658 A1 | 5/2012 | Wilk | |
| 2012/0127714 A1 | 5/2012 | Rehn | |
| 2012/0134146 A1 | 5/2012 | Smith | 362/225 |
| 2012/0140442 A1 | 6/2012 | Woo et al. | 362/95 |
| 2012/0140461 A1 | 6/2012 | Huang et al. | |
| 2012/0206926 A9 | 8/2012 | Chou | |
| 2012/0320576 A1 | 12/2012 | Wald | |
| 2013/0235568 A1 | 9/2013 | Green et al. | 362/218 |
| 2013/0242550 A1 | 9/2013 | Suen | |
| 2013/0258652 A1 | 10/2013 | Hsieh | 362/225 |
| 2014/0022485 A1* | 1/2014 | Kuo | G02F 1/133308 349/58 |
| 2014/0043557 A1* | 2/2014 | Kuo | G02F 1/133308 349/58 |
| 2014/0265930 A1 | 9/2014 | Harris | 315/307 |
| 2015/0009447 A1* | 1/2015 | Zhou | G02F 1/133308 349/58 |
| 2015/0016100 A1 | 1/2015 | Ishii | 362/223 |

FOREIGN PATENT DOCUMENTS

| | | |
|---|---|---|
| CN | 1963289 A | 5/2007 |
| CN | 101188261 | 5/2008 |
| CN | 101660715 | 3/2010 |
| CN | 101776254 | 7/2010 |
| CN | 101776254 A | 7/2010 |
| CN | 101790660 | 7/2010 |
| CN | 101790660 A | 7/2010 |
| CN | 102072443 | 5/2011 |
| CN | 202580962 | 12/2012 |
| DE | 102007030186 | 1/2009 |
| DE | 102007030186 A1 | 1/2009 |
| DE | 202010001832 | 7/2010 |
| EP | 1298383 | 4/2003 |
| EP | 1298383 A2 | 4/2003 |
| EP | 1357335 A2 | 10/2003 |
| EP | 1653254 | 3/2006 |
| EP | 1737051 | 12/2006 |
| EP | 1847762 | 10/2007 |
| EP | 1847762 A2 | 10/2007 |
| EP | 1860467 | 11/2007 |
| EP | 2287520 A2 | 2/2011 |
| EP | 2290690 A2 | 3/2011 |
| EP | 2636945 A2 | 9/2013 |
| GB | 774198 | 5/1957 |
| JP | 1069809 | 3/1998 |
| JP | 2002344027 | 11/2002 |
| JP | U3097327 | 8/2003 |
| JP | 2004140324 | 5/2004 |
| JP | 2004345615 | 12/2004 |
| JP | 2004345615 A | 12/2004 |
| JP | 2006173624 | 6/2006 |
| JP | 2008147044 | 6/2008 |
| JP | 3151501 U | 6/2009 |
| JP | 2009295577 | 12/2009 |
| JP | 2010103687 | 5/2010 |
| JP | 2011018571 | 8/2011 |
| JP | 2011018572 | 8/2011 |
| TW | 200524186 | 7/2005 |
| TW | 200524186 A | 7/2005 |
| TW | 200914759 A | 4/2009 |
| TW | 201018826 | 5/2010 |
| TW | 201018826 A | 5/2010 |
| WO | WO 03102467 | 12/2003 |
| WO | WO 2009030233 | 3/2009 |
| WO | WO 2009140761 A1 | 11/2009 |
| WO | WO 2009157999 | 12/2009 |
| WO | WO 2009157999 A | 12/2009 |
| WO | WO 2009157999 A1 | 12/2009 |
| WO | WO 2010024583 | 3/2010 |
| WO | WO 2010024583 A2 | 3/2010 |
| WO | WO 2010042216 | 4/2010 |
| WO | WO 2010042216 A2 | 4/2010 |
| WO | WO 2011074424 A1 | 6/2011 |
| WO | WO 2011096098 A1 | 8/2011 |
| WO | WO 2011098191 | 8/2011 |
| WO | WO 2011118991 A1 | 9/2011 |
| WO | WO 2011140353 A2 | 11/2011 |
| WO | WO 03102467 | 12/2013 |

OTHER PUBLICATIONS

Office Action from U.S. Appl. No. 13/828,348, dated Nov. 4, 2015.
Office Action from U.S. Appl. No. 14/020,757, dated Nov. 24, 2014.
First Office Action from Chinese Patent Appl. No. 2011800588770, dated Sep. 25, 2015.
Notice of Completion of Pretrial Re-examination from Japanese Patent appl. No. 2013-543207, dated Jun. 30, 2015.
Pretrial Report from Japanese Appl. No. 2013-543207, dated Jun. 19, 2015.
Decision of Rejection from Chinese Patent Appl. No. 201180052998.4, dated Jul. 16, 2015.
Office Action from U.S. Appl. No. 12/873,303, dated Jun. 22, 2015.
Response to OA from U.S. Appl. No. 12/873,303, filed Aug. 21, 2015.
Office Action U.S. Appl. No. 13/341,741, dated Jun. 22, 2015.
Office Action from U.S. Appl. No. 13/443,630, dated Jun. 23, 2015.
Response to OA from U.S. Appl. No. 13/443,630, filed Aug. 21, 2015.
Office Action from U.S. Appl. No. 13/189,535, dated Jul. 14, 2015.
Office Action from U.S. Appl. No. 13/453,924, dated Jul. 21, 2015.
Office Action from U.S. Appl. No. 13/442,746, dated Jul. 27, 2015.

(56) References Cited

OTHER PUBLICATIONS

Office Action from U.S. Appl. No. 14/020,757, dated Aug. 3, 2015.
First Office Action from Chinese Patent Appl. No. 2012800369142, dated Mar. 26, 2015.
Office Action from U.S. Appl. No. 13/464,745, dated Apr. 2, 2015.
Office Action from U.S. Appl. No. 13/442,746, dated Apr. 28, 2015.
Office Action from U.S. Appl. No. 13/368,217, dated May 13, 2015.
Office Action from U.S. Appl. No. 13/828,348, dated May 27, 2015.
First Official Action from European Patent Appl. No. 12 743 003.1-1757, dated Jan. 16, 2015.
Decision of Rejection from Japanese Appl. No. 2013-543207, dated Nov. 25, 2014.
Office Action from Mexican Appl. No. 100881, dated Nov. 28, 2014.
Grant Notice from European Appl. No. 13701525.1-1757, dated Nov. 24, 2014.
Preliminary Report on Patentability from PCT/US2013/035668, dated Oct. 14, 2014.
Office Action from U.S. Appl. No. 13/442,746, dated Sep. 15, 2014.
Office Action from U.S. Appl. No. 13/429,080, dated Sep. 16, 2014.
Office Action from U.S. Appl. No. 13/844,431, dated Oct. 10, 2014.
Office Action from U.S. Appl. No. 13/443,630, dated Oct. 10, 2014.
Office Action from U.S. Appl. No. 13/368,217, dated Oct. 22, 2014.
Office Action from U.S. Appl. No. 12/961,385, dated Nov. 6, 2014.
Office Action from U.S. Appl. No. 13/453,924, dated Nov. 7, 2014.
International Preliminary Report on Patentabiliby from PCT/US2012/071800 dated Jul. 10, 2014.
Office Action from U.S. Appl. No. 13/189,535, dated Jun. 20, 2014.
Office Action from U.S. Appl. No. 13/453,924, dated Jun. 25, 2014.
Office Action from U.S. Appl. No. 13/443,630, dated Jul. 1, 2014.
Office Action from Japanese Design Patent Application No. 2011-18570.
Reason for Rejection from Japanese Design Patent Application No. 2011-18571.
Reason for Rejection from Japanese Design Patent Application No. 2011-18572.
Cree LR24 Architectural LED troffer product information. 2 pages, available at www.cree.com/lighting.
U.S. Appl. No. 13/464,745, filed May 4, 2012, Pratt, et al.
International Search Report and Written Opinion for PCT Application No. PCT/US2011/062396, dated Jul. 13, 2012.
U.S. Publication No. US 2007/0115671, date: May 24, 2017 to Roberts et al.
U.S. Publication No. US 2007/0115670, date: May 24, 2007 to Roberts et al.
U.S. Publication No. US 2009/0323334, date: Dec. 31, 2009 to Roberts et al.
U.S. Publication No. US 2009/0225543, date: Mar. 5, 2008 to Roberts et al.
U.S. Appl. No. 12/873,303, filed Aug. 31, 2010 to Edmond, et al.
U.S. Appl. No. 12/961,385, filed Dec. 6, 2010 to Pickard, et al.
Cree's XLamp XP-E LED's, data sheet, pp. 1-17.
Cree's XLamp XP-G LED's, data sheet, pp. 1-12.
International Search Report and Written Opinion for Patent Application No. PCT/US2011/001517, dated Feb. 27, 2012.
U.S. Appl. No. 12/418,796, filed Apr. 6, 2009.
U.S. Appl. No. 13/429,080, filed Mar. 23, 2012.
U.S. Appl. No. 13/028,946, filed Feb. 16, 2011.
U.S. Appl. No. 13/306,589, filed Nov. 29, 2011.
U.S. Appl. No. 13/549,052, filed Oct. 10, 2012, Lowes, et al.
U.S. Appl. No. 13/649,067, filed Oct. 10, 2012, Lowes, et al.
U.S. Appl. No. 13/207,204, filed Aug. 10, 2011, Athalye, et al.
U.S. Appl. No. 13/365,844.
U.S. Appl. No. 13/662,618, filed Oct. 29, 2012, Athalye, et al.
U.S. Appl. No. 13/462,388, filed May 2, 2012.
U.S. Appl. No. 13/842,150, filed Mar. 15, 2013, Dixon, et al.
U.S. Appl. No. 13/770,389, filed Feb. 19, 2013, Lowes, et al.
U.S. Appl. No. 13/782,820, filed Mar. 1, 2013, Dixon, et al.
XLamp®C family from Cree®, Inc., Product Family Data Sheet, 15 pages.
XLamp®M family from Cree®. Inc., Product Family Data Sheet, 14 pages.
XLamp®X family from Cree®, Inc., Product Family Data Sheet, 17 pages.
Energy Star® Program Requirements for Solid State Lighting Luminaires, Eligibility Criteria—Version 1.1, final: Dec. 19, 2008.
Assist Recommends . . . LED Life for General Lighting: Definition of Life, vol. 1, Issue 1, Feb. 2005.
"IES Approved Method for Measuring Lumen Maintenance of LED light Sources", Sep. 22, 2008, ISBN No. 978-0-87995-227-3, (LM-80).
International Search Report and Written Opinion from PCT Application No. PCT/US2013/021053, dated Apr. 17, 2013.
Search Report and Written Opinion from PCT Patent Appl. No. PCT/US2012/047084, dated Feb. 27, 2013.
Search Report and Written Opinion from PCT Patent Appl. No. PCT/US2012/071800, dated Mar. 25, 2013.
U.S. Appl. No. 12/074,762, filed Mar. 2008, Jacobsen, et al.
U.S. Appl. No. 13/442,311, filed Apr. 2012, Lu, et al.
U.S. Appl. No. 13/763,270, filed Feb. 2010, Heeter, et al.
Citadel(tm) SLP Lighting (http://www.slplighting.com/enclosures.html).
Final Rejection issued in Korean Design Appl. No. 30-2011-0038114, dated Jun. 14, 2013.
Final Rejection issued in Korean Design Appl. No. 30-2011-0038115, dated Jun. 14, 2013.
Final Rejection issued in Korean Design Appl. No. 30-2011-0038116, dated Jun. 17, 2013.
International Search Report and Written Opinion from PCT Patent Appl. No. PCT/US2013/035668, dated Jul. 12, 2013.
Notice to Submit a Response from Korean Patent Application No. 30-2011-0038115, dated Dec. 12, 2012.
Notice to Submit a Response from Korean Patent Application No. 30-2011-0038116, dated Dec. 12, 2012.
International Search Report and Written Opinion from Appl. No. PCT/CN2013/072772, dated Dec. 19, 2013.
International Search Report and Written Opinion from PCT/US2013/049225, dated Oct. 24, 2013.
Office Action from U.S. Appl. No. 29/387,171, dated May 2, 2012.
Response to OA from U.S. Appl. No. 29/387,171, filed Aug. 2, 2012.
Office Action from U.S. Appl. No. 12/961,365, dated Apr. 26, 2013.
Response to OA from U.S. Appl. No. 12/961,385, filed Jul. 24, 2013.
Office Action from U.S. Appl. No. 13/464,745, dated Jul. 16, 2013.
Office Action from U.S. Appl. No. 29/368,970, dated Jun. 19, 2012.
Office Action from U.S. Appl. No. 29/368,970, dated Aug. 24, 2012.
Response to OA from U.S. Appl. No. 29/368,970, filed Nov. 26, 2012.
Office Action from U.S. Appl. No. 12/961,385, dated Nov. 6, 2013.
U.S. Appl. No. 14/145,559, filed Dec. 31, 2013, Lui, et al.
U.S. Appl. No. 12/463,709, filed May 11, 2009, Donofrio, et al.
U.S. Appl. No. 11/656,759, filed Jan. 22, 2007, Chitnis, et al.
U.S. Appl. No. 11/899,790, filed Sep. 7, 2007, Chitnis, et al.
U.S. Appl. No. 12/566,195, filed Sep. 24, 2009, Van de Ven, et al.
U.S. Appl. No. 12/704,730, filed Feb. 12, 2010, Van de Ven, et al.
U.S. Appl. No. 14/145,355, filed Dec. 31, 2013, Van de Ven, et al.
U.S. Appl. No. 13/828,348, filed Mar. 14, 2013, Edmond, et al.
U.S. Appl. No. 13/345,215, filed Jan. 6, 2012, Lu, et al.
White97 ▌ film Technical Data Sheet from WhiteOptics, LLC of New Castel.
Preliminary Report and Written Opinion from PCT appl. No. PCT/US2012/047084, dated Feb. 6, 2014.
Office Action from U.S. Appl. No. 13/787,727, dated Jan. 29, 2015.
Office Action from U.S. Appl. No. 13/429,080, dated Feb. 18, 2015.
Office Action from U.S. Appl. No. 13/453,924, dated Mar. 10, 2015.
Second Office Action and Search Report from Chinese Appl. No. 2011800529984, dated Dec. 26, 2014.
Grant Notice from European Appl. No. 13701525.1, dated Nov. 19, 2014.
International Report and Written Opinion from PCT/US2013/049225, dated Jan. 22, 2015.
Office Action from U.S. Appl. No. 13/828,348, dated Nov. 20, 2014.

(56) References Cited

OTHER PUBLICATIONS

Office Action from U.S. Appl. No. 12/873,303, dated Nov. 28, 2014.
Office Action from U.S. Appl. No. 13/464,745, dated Dec. 10, 2014.
Office Action from U.S. Appl. No. 13/341,741, dated Dec. 24, 2014.
Office Action from U.S. Appl. No. 13/189,535, dated Jan. 13, 2015.
Communication from European Patent Appl. No. 13701525.1-1757, dated Sep. 26, 2014.
Office Action from U.S. Appl. No. 13/464,745, dated Jul. 16, 2014.
International Preliminary Report on Patentability and Written Opinion from PCT/US2013/021053, dated Aug. 21, 2014.
Reasons for Rejection from Japanese Patent Appl. No. 2013-543207, dated May 20, 2014.
First Office Action from Chinese Patent Appl. No. 2011800529984, dated May 4, 2014.
Office Action from U.S. Appl. No. 13/544,662, dated May 5, 2014.
Office Action from U.S. Appl. No. 13/844,431, dated May 15, 2014.
Office Action from U.S. Appl. No. 13/341,741, dated Jun. 6, 2014.
Examination Report from Taiwanese Patent Appl. No. 100131021, dated Jan. 5, 2016.
Examination from European Patent Appl. No. 12743003.1-1757, dated Jan. 8, 2016.
Notice of Reasons for Rejection from Japanese Patent Appl. No. 2013-543207, dated Feb. 2, 2016.
Examination from European Patent Appl. No. 13 701 525.1-1757, dated Feb. 3, 2016.
Office Action from U.S. Appl. No. 13/189,535; dated Jan. 6, 2016.
Office Action from U.S. Appl. No. 13/341,741, filed Jan. 8, 2016.
Office Action from U.S. Appl. No. 13/873,303, filed Feb. 2, 2016.
Office Action from U.S. Appl. No. 13/464,745, filed Mar. 1, 2016.
Office Action from U.S. Appl. No. 14/716,480, filed Mar. 3, 2016.
Office Action from U.S. Appl. No. 13/368,217, filed Mar. 4, 2016.
Office Action from U.S. Appl. No. 13/189,535, filed Mar. 18, 2016.
Office Action from U.S. Appl. No. 14/020,757, filed Apr. 7, 2016.
Office Action from U.S. Appl. No. 29/466,391, filed May 10, 2016.
Second Office Action for Application No. 2011800588770, dated Mar. 29, 2016.
Office Action from U.S. Appl. No. 13/429,080, dated Sep. 1, 2015.
Office Action from U.S. Appl. No. 14/716,480, dated Sep. 24, 2015.
Office Action from U.S. Appl. No. 14/170,627, dated Oct. 5, 2015.
Office Action from U.S. Appl. No. 13/368,217, dated Oct. 8, 2015.
Office Action from U.S. Appl. No. 13/464,745, dated Oct. 8, 2015.
Office Action from U.S. Appl. No. 29/466,391, dated Oct. 14, 2015.
Office Action for U.S. Appl. No. 13/828,348; dated Jun. 2, 2016.
Notice of Reason for Rejection for Japanese Appl. No. 2013-543207; dated May 24, 2016.
Office Action for Chinese Patent Application No. 2011800588770; dated Sep. 26, 2016.
Notification of Reexamination for Chinese Application No. 2011800529984; dated Oct. 10, 2016.
Office Action for U.S. Appl. No. 13/828,348; dated Oct. 17, 2016.
Office Action for European Application No. 11754767.9; dated Oct. 31, 2016.
Office Action for U.S. Appl. No. 12/873,303; dated Nov. 25, 2016.
Notice of Allowance for Taiwan Application No. 100131021; dated Nov. 28, 2016.
Office Action for U.S. Appl. No. 13/368,217, dated Jan. 3, 2017.
Office Action for U.S. Appl. No. 14/020,757; dated Jul. 19, 2016.
Examination Report from Taiwan Application No. 100131021; dated Jul. 21, 2016.
Office Action for U.S. Appl. No. 14/716,480; dated Aug. 26, 2016.
European Summons for Oral Proceedings for Application No. 12743003.1; dated Sep. 2, 2016.
Office Action for U.S. Appl. No. 13/464,745; dated Sep. 7, 2016.
European Notice of Allowance for Application No. 12743003.1; dated Mar. 17, 2017.
Office Action for U.S. Appl. No. 13/189,535; dated Mar. 23, 2017.
Office Action for U.S. Appl. No. 13/464,745; dated Mar. 23, 2017.
Foreign Office Action for Chinese Application No. 2011800529984; dated Apr. 5, 2017.
Office Action for U.S. Appl. No. 14/721,806; dated Apr. 21, 2017.
Office Action for U.S. Appl. No. 13/443,630; dated May 18, 2017.
Office Action for U.S. Appl. No. 14/170,627 dated Jun. 16, 2017.
Office Action for U.S. Appl. No. 14/716,480; dated Jul. 5, 2017.
Office Action for U.S. Appl. No. 13/873,303; dated Aug. 9, 2017.
Office Action for U.S. Appl. No. 13/828,348; dated Sep. 1, 2017.
Office Action for U.S. Appl. No. 13/464,745; dated Dec. 11, 2017.
Office Action for U.S. Appl. No. 14/716,480; dated Jan. 17, 2018.
Office Action for U.S. Appl. No. 13/189,535; dated Oct. 30, 2017.
Office Action for U.S. Appl. No. 14/721,806; dated Nov. 1, 2017.
Office Action for U.S. Appl. No. 14/170,627; dated Nov. 29, 2017.
Office Action for U.S. Appl. No. 14/170,627; dated Jun. 4, 2018.
Office Action for U.S. Appl. No. 12/873,303; dated Jun. 19, 2018.
Office Action for U.S. Appl. No. 13/828,348; dated Jun. 26, 2018.
Office Action for U.S. Appl. No. 14/716,480; dated Jul. 13, 2018.
Office Action for U.S. Appl. No. 14/721,806; dated Jul. 27, 2018.
Office Action for U.S. Appl. No. 13/189,535; dated Apr. 5, 2018.
Office Action for U.S. Appl. No. 13/464,745; dated May 2, 2018.
Foreign Office Action for European Application No. 11754767.9; dated May 7, 2018.

* cited by examiner

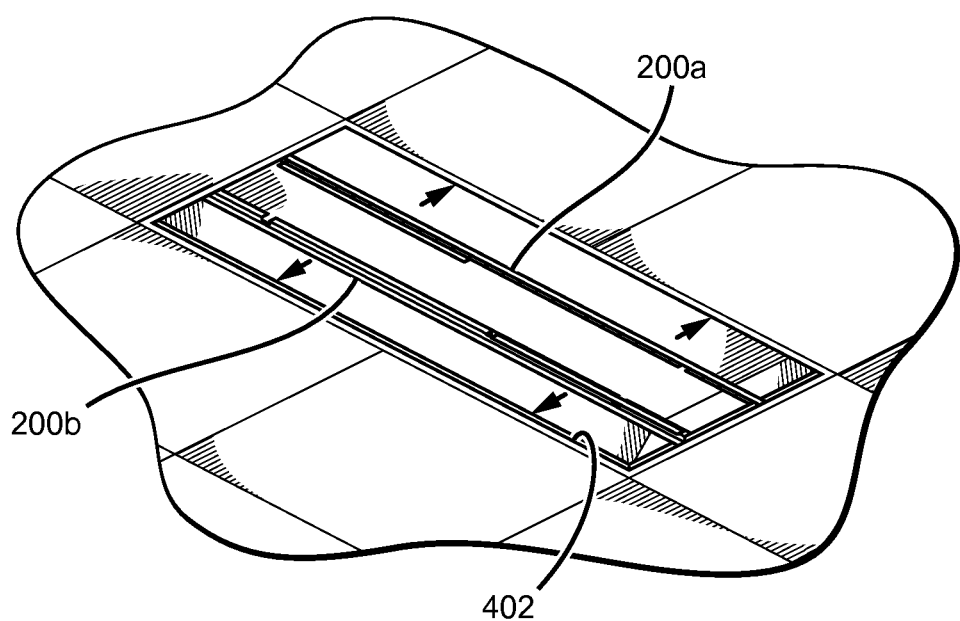
FIG. 4
FIG. 5a
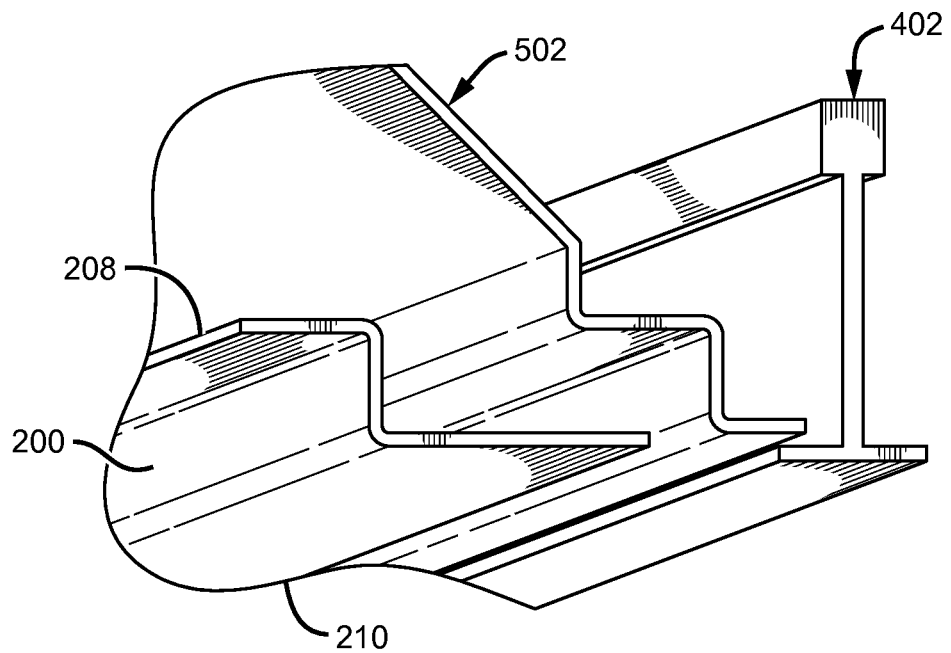

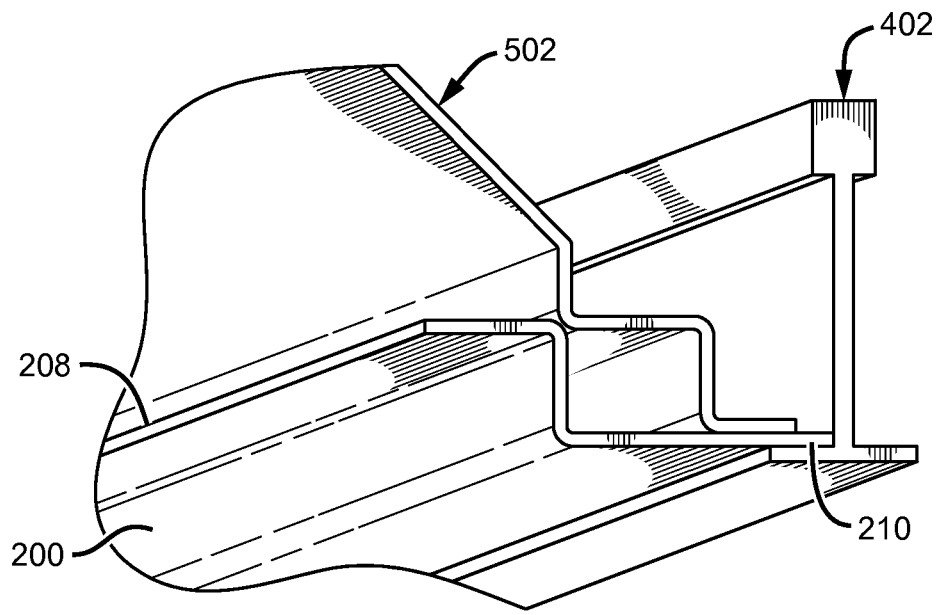
FIG. 5b
FIG. 6
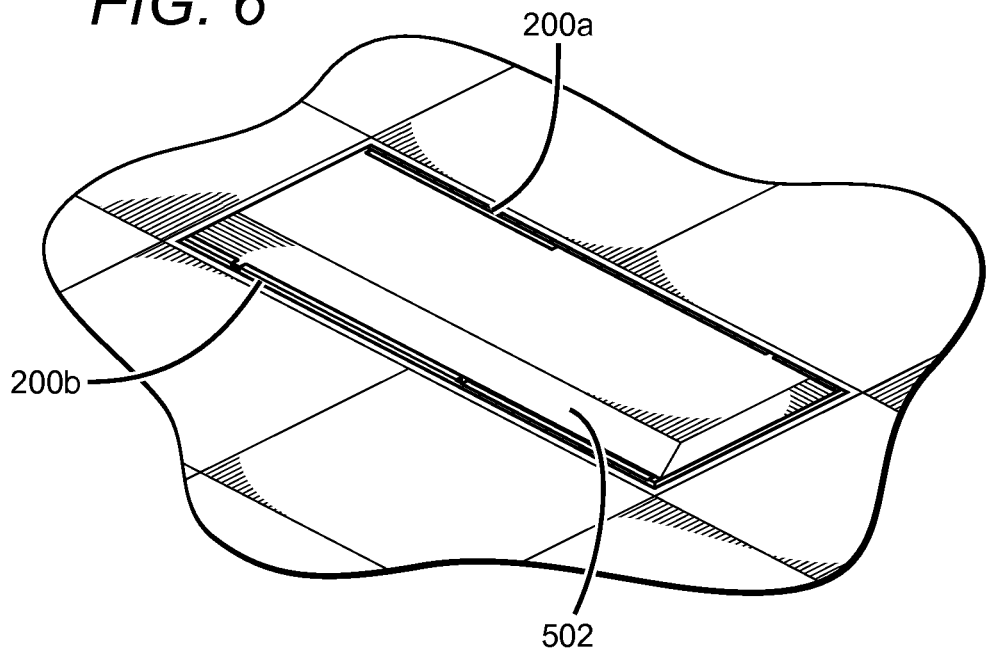

FRAME AND LENS UPGRADE KITS FOR LIGHTING FIXTURES

BACKGROUND OF THE INVENTION

1. Field of the Invention

The invention relates to retrofit systems and methods for lighting installations, and in particular, to retrofit systems and methods used to retrofit troffer-style lighting installations with LED light sources.

2. Description of the Related Art

Troffer-style fixtures are ubiquitous in commercial office and industrial spaces throughout the world. In many instances these troffers house elongated tubular fluorescent lamps or light bulbs that span the length of the troffer. Troffers may be mounted to or suspended from ceilings, such as by suspension from a "T-grid". Often the troffer may be recessed into the ceiling, with the back side of the troffer protruding into the plenum area above the ceiling. Typically, elements of the troffer on the back side dissipate heat generated by the light source into the plenum where air can be circulated to facilitate the cooling mechanism. U.S. Pat. No. 5,823,663 to Bell, et al. and U.S. Pat. No. 6,210,025 to Schmidt, et al. are examples of typical troffer-style fixtures.

More recently, with the advent of the efficient solid state lighting sources, these troffers have been used with LEDs as their light source. LEDs are solid state devices that convert electric energy to light and generally comprise one or more active regions of semiconductor material interposed between oppositely doped semiconductor layers. When a bias is applied across the doped layers, holes and electrons are injected into the active region where they recombine to generate light. Light is produced in the active region and emitted from surfaces of the LED.

LEDs have certain characteristics that make them desirable for many lighting applications that were previously the realm of incandescent or fluorescent lights. Incandescent lights are energy-inefficient sources with approximately ninety percent of the electricity they consume being released as heat rather than light. Fluorescent light bulbs are more energy-efficient than incandescent light bulbs by a factor of about 10, but are still relatively inefficient compared to LEDs, which can provide the same luminous flux as incandescent and fluorescent lights using a fraction of the energy.

In addition, LEDs can have a significantly longer operational lifetime. Incandescent light bulbs have relatively short lifetimes, with some having a lifetime in the range of about 750-1000 hours. Fluorescent bulbs can also have lifetimes longer than incandescent bulbs, such as in the range of approximately 10,000-20,000 hours, but provide less desirable color. In comparison, LEDs can have lifetimes between 50,000 and 70,000 hours. The increased efficiency and extended lifetime of solid state sources has resulted in widespread adoption of LEDs in place of conventional light sources in many different applications. It is predicted that further improvements will result in their general acceptance in more and more lighting applications. Movement toward universal usage of LEDs in place of incandescent or fluorescent lighting will result in increased lighting efficiency and significant energy saving.

There has been recent interest in upgrading existing troffer-style lighting systems with LED sources (or light engines) to capitalize on the above advantages. Current options for upgrading include complete fixture replacement such as by the commercially available CR Series Architectural LED Troffer, provided by Cree, Inc. Some features of these troffers are described in U.S. patent application Ser. No. 12/873,303, titled "TROFFER-STYLE FIXTURE", and assigned to Cree, Inc. Performing complete fixture replacement can require penetrating the ceiling plenum by a skilled technician. This can be time consuming and expensive, and in many locations, building codes can require that a licensed electrician perform any work in the plenum space above a ceiling.

During the upgrade process, contamination may also be a concern, particularly in a hospital or clean room environment. In upgrade processes where the entire fixture is replaced, the sheet metal pan or housing of an existing troffer lighting system is removed. Removing the "host fixture" pan can generate dust which must be contained and cleaned prior to resuming normal operations within the environment. Preventing dust is of particular concern areas known to contain hazardous building materials, such as asbestos. In certain environments, construction permits may be required for an upgrade process that requires removal of the troffer pan, which can add additional complication and cost.

Another alternative upgrade option is by fixture retrofit where a new LED-based light engine can be installed into the sheet metal pan of an existing troffer lighting system. This can provide the advantage of using light engines with design features such as reflectors, lenses, and power supplies which have been optimized for an LED-based system. It also allows light engines which are approved for use in other applications to be used in a retrofit application. Examples of LED-based retrofit kits are discussed in detail in U.S. patent application Ser. No. 13/464,745, titled "MOUNTING SYSTEM FOR RETROFIT LIGHT INSTALLATION INTO EXISTING LIGHT FIXTURES", which is commonly assigned with the present application to Cree, Inc. and incorporated by reference as if set forth fully herein. Some retrofits do not require the removal of the existing troffer pan prior to installation, with the pan acting as a barrier to the plenum space. Leaving the pan intact during the retrofit process does not disturb wiring connections, insulation, etc., above the ceiling plane. Leaving the pan in place can also allow for work to be performed by non-licensed personnel, which can eliminate costs for work that is required to be performed by licensed electricians. In some current retrofit products, replacement lamps or LED light engines are held into the existing fixture or sheet metal pan with brackets and screws. Some of these arrangements may require penetrating the ceiling, and some of these installations can be slow and labor-intensive.

Other upgrades involve replacing the fluorescent light bulbs/tubes with replacement tubes having LEDs along their length. This upgrade can utilize existing fluorescent lamp fixtures including the electrical ballast and wiring. However, compared to light engines designed to capitalize on the characteristics of LEDs, these replacement lamps can require much more energy for a given light output (lower efficacy), provide little to no cost benefit. In addition, the tubular format relies on the existing optical reflectors and lenses, which were designed for the light distribution characteristics of a fluorescent source.

SUMMARY OF THE INVENTION

One embodiment of a system according to the present invention comprises the following elements. A frame bracket comprises first and second frame bracket subassemblies that releasably lock together to define a frame area and an interior flange around the frame area. A lens frame comprising a mount surface is shaped to fit within the frame area. An attachment latch releasably fastens the lens frame to the frame bracket assembly.

Another embodiment of a system according to the present invention comprises the following elements. A frame bracket comprises interior and exterior flanges and defines a frame area. A lens frame comprises a mount surface and is shaped to fit within the frame area. A planar lens is sized to fit within the lens frame. A plurality of corner braces are shaped to fit inside interior corners of the lens frame to reinforce the structure of the frame, each of the corner braces comprising bendable tabs that may be bent down to urge the lens against the mount surface of the lens frame. An attachment latch releasably fastens the lens frame to the frame bracket.

One embodiment of a frame bracket according to the present invention comprises the following elements. A plurality of bracket subassemblies each comprise: an elongated side bracket comprising a pivot end and a first-type locking feature at a lock end opposite the pivot end and an elongated edge bracket comprising a pivot end and a second-type locking feature at a lock end opposite the pivot end, the first-type locking feature on the first frame bracket subassembly designed to mate with the second-type locking feature on the second frame bracket subassembly. The side bracket and the edge bracket are pivotally fastened at their respective pivot ends such that the frame bracket pivots between an open configuration and a closed configuration, the frame area defined when the first and second frame bracket subassemblies are releasably locked together in the open configuration.

Another embodiment of a system according to the present invention comprises the following elements. A frame bracket comprises first and second frame bracket subassemblies that releasably lock together to define a frame area and an interior flange around the frame area. A lens is sized to fit within the frame area of the lens frame. The lens is held in place within the frame area by the frame bracket.

These and other further features and advantages of the invention would be apparent to those skilled in the art from the following detailed description, taken together with the accompanying drawings, in which:

BRIEF DESCRIPTION OF THE DRAWINGS

FIG. 4 is a perspective view of first and second frame bracket subassemblies during an assembly process.

FIGS. 5a and 5b are close-up cutaway views of a subassembly also during assembly.

FIG. 6 is a perspective view of frame bracket subassemblies after they have been slid into position.

DETAILED DESCRIPTION OF THE INVENTION

Figure 1:
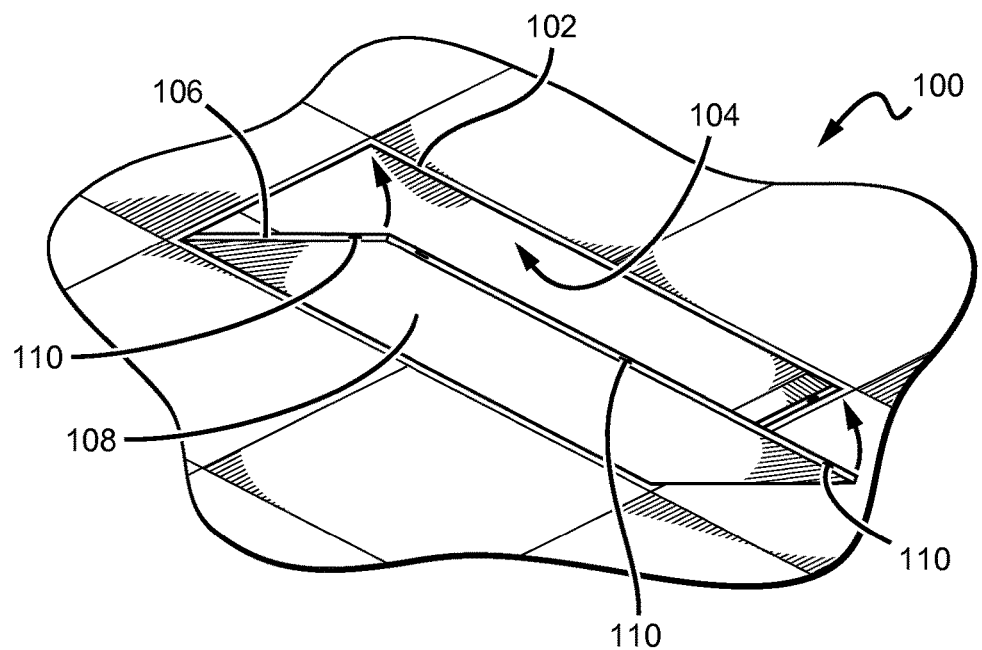
FIG. 1 is a perspective view of a lens frame system according to an embodiment of the present invention.

Embodiments of the present invention provide retrofit systems that can be used with different light fixtures, but that are particularly adapted for use with troffer-style fixtures. The retrofit systems can be used with many different light sources but are particularly well-suited for use with solid state light sources such as those utilizing LEDs. Systems described herein may work particularly well with existing LED upgrade kits such as the UR Series LED Upgrade Kit, which is commercially available from Cree, Inc. (http://www.cree.com/Lighting/Products/Indoor/Upgrade-Solutions/UR-Series). Some embodiments of the present invention comprise a mechanical mounting system for installing an LED light source within an existing lighting system housing or pan, such as a troffer pan, without penetrating the ceiling plenum.

By leaving the existing troffer pan in place, embodiments of the present invention can utilize the troffer pan to act as a barrier against the spread of fire and smoke. In many areas, local codes may not allow for the use of plastic components inside the plenum space above the ceiling. This is due to concerns that if a fire occurred in one room, toxic smoke from burning plastics could be carried to other locations which share the plenum. Maintaining the host fixture troffer pan as a barrier to this spread of toxic smoke can allow for the use of lower cost plastic parts above the ceiling line in the troffer pan. Without the troffer pan barrier, these plastic parts might otherwise not be allowed in the plenum space.

Because the spacing in most T-grids is consistent, the spacing between the vertical members of the T-grid is also consistent. By taking advantage of this regularity, a framing system can be used to create a means to attach a lens or fixtures to a large number of T-Grid ceilings. Some embodiments of the present invention can comprise components, inserts, panels or mounts arranged on and spanning across the ceiling T-grid and spanning across the existing pan, to form a mounting frame or assembly for a light source. In some embodiments, a frame bracket system can rest on the lip of the T-grid, at least partially spanning the T-grid opening to provide opening in the troffer sized for the LED light source. In some of these embodiments, the frame bracket system can be located in and supported directly by the ceiling T-grid, and does not rely on the existing troffer pan for support or location. Embodiments of the frame brackets can be erected quickly and easily without requiring tools, fasteners or adhesives, but it is understood that in other embodiments they can be used.

Some embodiments of the present invention comprise a frame bracket rests on or is attached to the horizontal portion of a T-grid. The frame bracket defines the frame area, which in some embodiments is rectangular, for example, 2 ft. by 4 ft. Other embodiments may have different dimensions, such as 2 ft. by 2 ft. or 1 ft. by 4 ft., for example. A lens frame fits just inside the frame bracket with the lens frame being releasably attached thereto. In some embodiments, the frame bracket can be constructed from collapsible frame bracket subassemblies. For example, a rectangular frame bracket may be assembled from first and second collapsible frame bracket subassemblies that fan out and lock together to create a rigid frame bracket. The subassemblies each comprise elongated side and edge brackets that are fastened together such that they can pivot about one another. In some embodiments, one side of the lens frame is attached to a corresponding side of the frame bracket with a rotatable clip that allows the lens frame to swing such that its other side can attach to the bracket frame with an attachment latch, which in some embodiments is magnetic.

The present invention is described herein with reference to certain embodiments, but it is understood that the invention can be embodied in many different forms and should not be construed as limited to the embodiments set forth herein. In particular, the present invention is described below in regards to certain retrofit systems that can be used to retrofit and/or upgrade troffer-style fixtures or lighting systems, but it is understood that the system can be used to retrofit and/or upgrade other types of lighting systems as well. The retrofit systems can also be used with many different light systems, sources and engines beyond those described herein, with many being LED-based.

It is understood that when an element can be referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one element to another. It is understood that these terms are intended to encompass different orientations of the device in addition to the orientation depicted in the figures.

Although the ordinal terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present invention.

As used herein, the term "source" can be used to indicate a single light emitter or more than one light emitter functioning as a single source. For example, the term may be used to describe a single blue LED, or it may be used to describe a red LED and a green LED in proximity emitting as a single source, such as in a light bar, for example. Thus, the term "source" should not be construed as a limitation indicating either a single-element or a multi-element configuration unless clearly stated otherwise.

Embodiments of the invention are described herein with reference to schematic illustrations. As such, the actual thickness of elements can be different, and variations from the shapes of the illustrations as a result, for example, of manufacturing techniques and/or tolerances are expected. Thus, the elements illustrated in the figures are schematic in nature. The illustrations are not intended to illustrate the precise shape or relative size of an element and are not intended to limit the scope of the invention.

FIG. 1 is a perspective view of a lens frame system 100 according to an embodiment of the present invention. This particular embodiment is built to fit a rectangular fixture opening in a ceiling have a length-to-width ratio of 2:1, although it is understood that other systems may be designed for openings having other shapes and dimensions. A frame bracket 102 is mounted to the ceiling around the perimeter of the opening, defining the frame area 104. The frame bracket 102 provides the base structure to which a lens frame 106 is attached. The lens frame 106 houses a planar lens 108 which sits on a mount surface of the lens frame 106. The lens frame 106 is releasably attached to the frame bracket 102 with attachment latches 110, such that it can be easily removed to facilitate maintenance or replacement of components within the fixture. In FIG. 1, the lens frame 106 is only shown attached to the frame bracket 102 on one side so that the internal structure is visible. When fully installed the lens frame 106 is shut, as shown by the arrows, and attached to the frame bracket.

Figure 2:
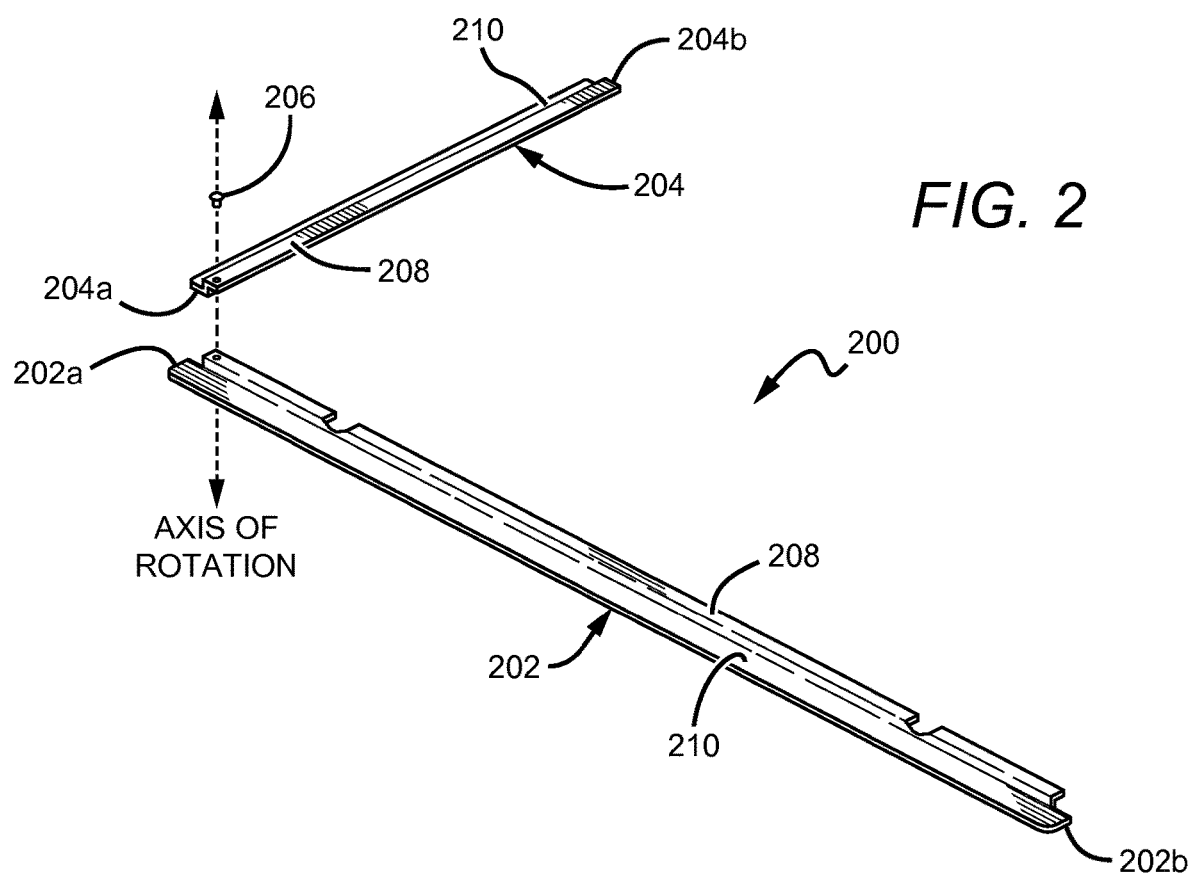
FIG. 2 is an exploded view of a frame bracket subassembly that may be used in embodiments of the present invention.

FIG. 2 is an exploded view of a frame bracket subassembly 200 that may be used in embodiments of the present invention. For example, two such subassemblies may be used to construct the rectangular frame bracket 100. The subassembly 200 comprises an elongated side bracket 202 having a pivot end 202a and a lock end 202b and an edge bracket 204 also having a pivot end 204a and a lock end 204b. The side bracket 202 and the edge bracket 204 are pivotally connected at their respective pivot ends 202a, 204a such that they can move back and forth around an axis of rotation. The brackets 202, 204 may be connected with a pin 206 or the like. Each bracket 202, 204 has an interior flange 208 and an exterior flange 210. The interior flange 208 provides a surface to which the lens frame 106 can be attached. The exterior flange 210 is attached to or rests on the horizontal portion of the T-grid. The brackets 202, 204 can be made from several materials with some suitable materials being bent sheet metal, extruded metal, bent plastic, and extruded plastic, for example.

Figure 3A:
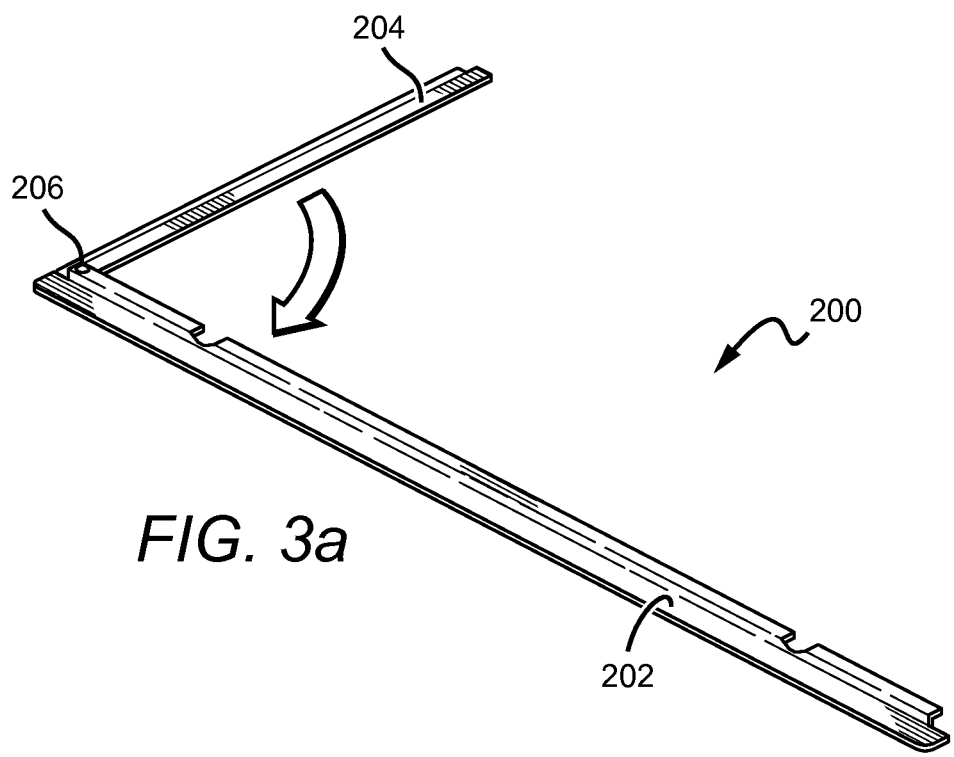
FIGS. 3a and 3b are perspective views of the bracket frame subassembly in two different configurations.
Figure 3B:
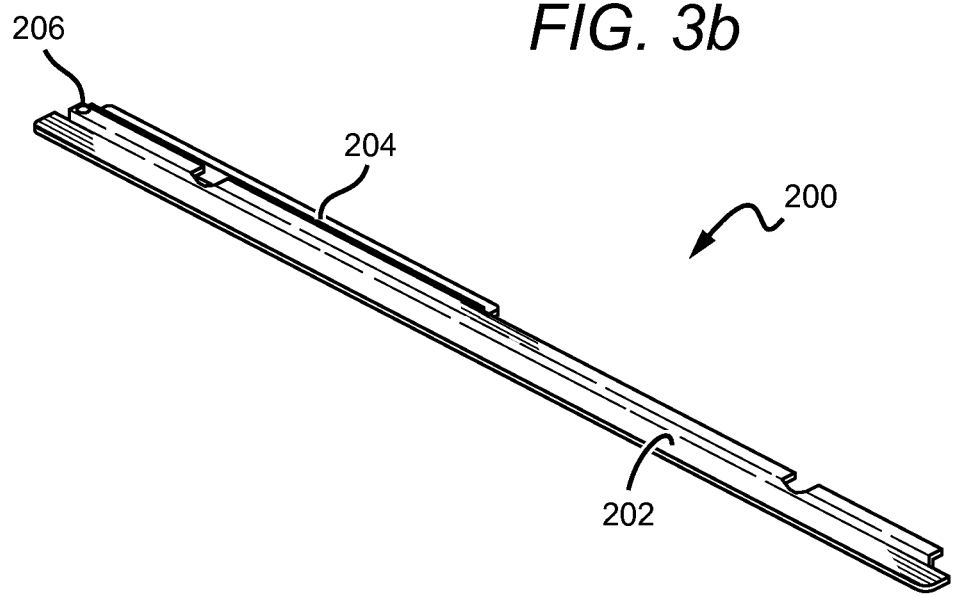

FIGS. 3a and 3b are perspective views of the bracket frame subassembly 200 in two different configurations. FIG. 3a shows the bracket frame subassembly 200 in an open configuration. In the open configuration the subassembly 200 may be locked together with a similar subassembly to form the rectangular bracket frame 102. As shown in FIG. 3b, the closed configuration provides for compact storage and shipping (as in a tube, for example) and also allows the subassembly 200 to be easily placed into position on the T-grid prior to fanning it out to the open configuration for assembly.

FIGS. 4-9 show the lens frame system 100 at various steps during the installation process. It is understood that the installation method shown is merely exemplary, and that many other methods may be used to install the lens frame system 100 and other similar systems.

FIG. 4 is a perspective view of first and second frame bracket subassemblies 200a, 200b during the assembly process. FIGS. 5a and 5b are close-up cutaway views of the subassembly 200 also during assembly. While in the closed configuration, the subassemblies 200a, 200b are positioned along the length of the opening in the ceiling as shown with the edge bracket 204 toward the interior of the opening. Then the subassemblies 200a, 200b are slid toward the lengthwise edges of the T-grid (shown by the arrows) until the exterior flange 210 abuts against the vertical portion of the T-grid as shown in FIGS. 5a and 5b. As previously discussed, embodiments of the lens frame system 100 may utilize portions of a previously installed fixture. In this embodiment, the pan lay-in 502 of a previously installed troffer-style fixture remains in the ceiling as the lens frame system 100 is installed. As shown in FIG. 5b, the exterior flange 210 of the subassembly 200 slides between the foot of the lay-in 502 and the horizontal portion of the T-grid 402 until it abuts the vertical portion of the T-grid 402. FIG. 6 is a perspective view of the frame bracket subassemblies 200a, 200b after they have been slid into position as shown in FIG. 5b.

Figure 7:
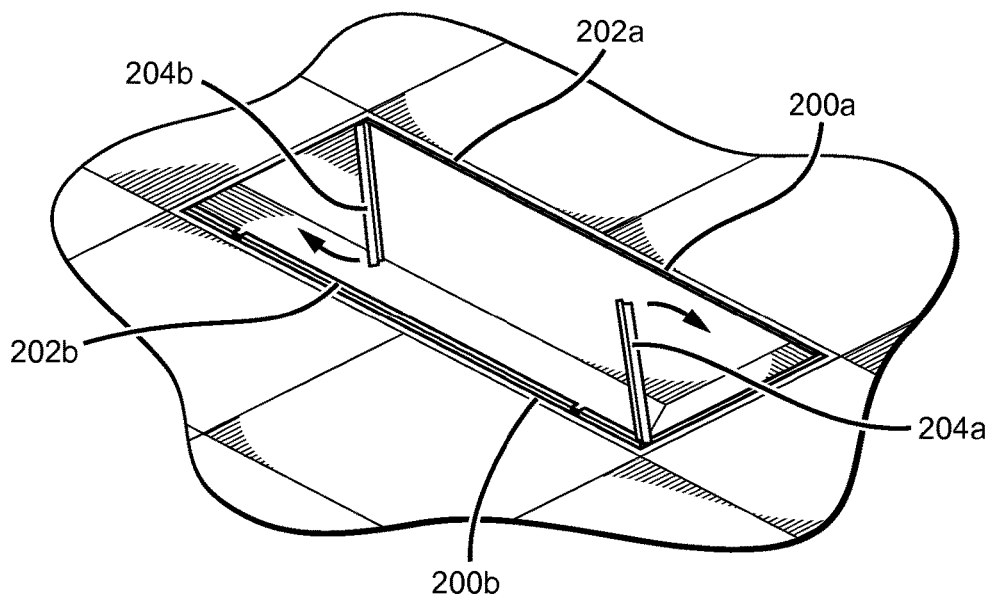
FIG. 7 shows two subassemblies as edge brackets are being pivoted out away from side brackets.
Figure 8A:
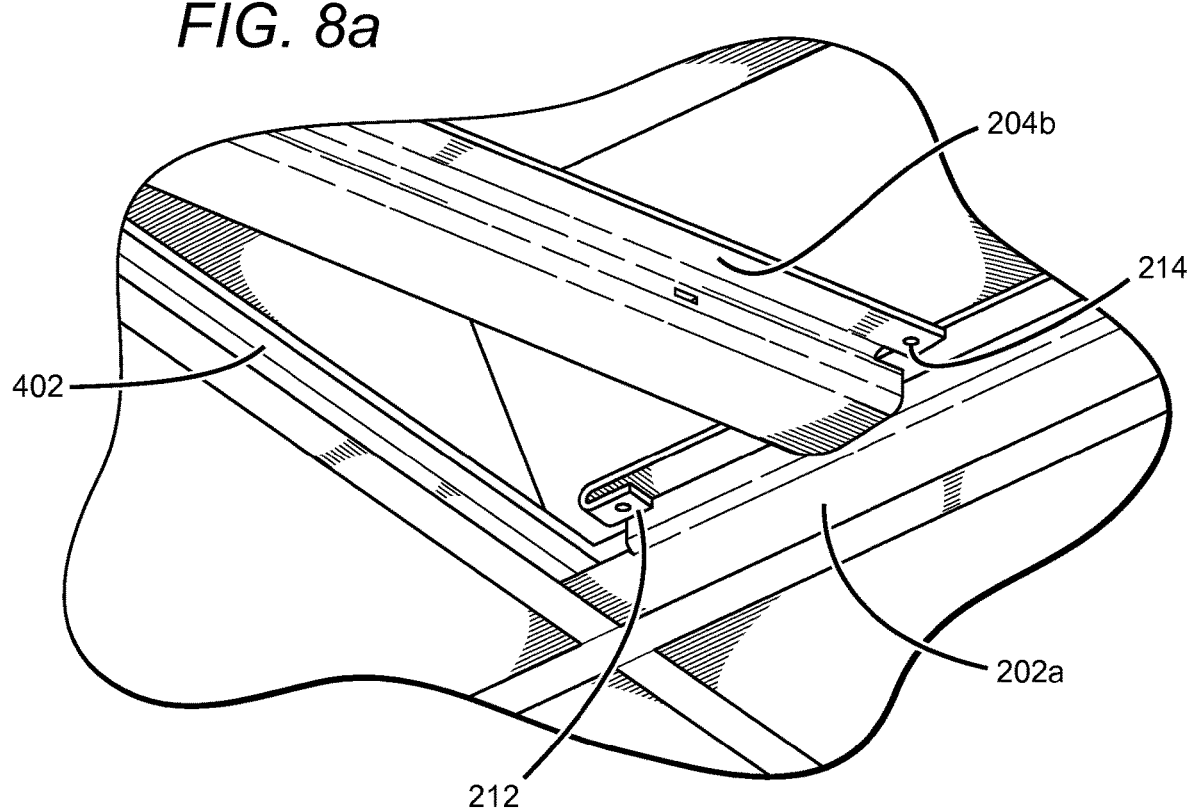
FIGS. 8a and 8b are close-up perspective views of a lock end of a side bracket from a subassembly and a lock end of an edge bracket from a subassembly.
Figure 8B:
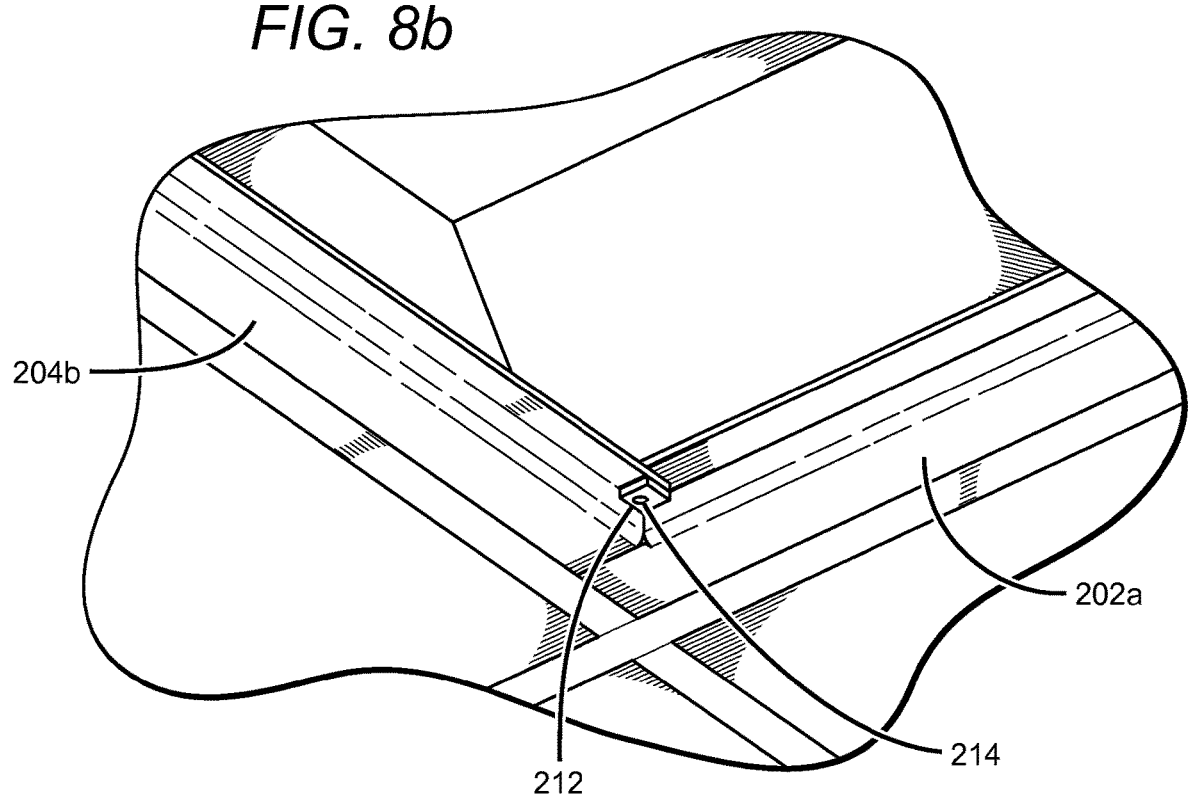

FIG. 7 shows the subassemblies 200a, 200b as the edge brackets 204 are being pivoted out away from the side brackets 202 (as shown by the arrows), transitioning the subassemblies 200a, 200b from the closed configuration to the open configuration. FIGS. 8a and 8b are close-up perspective views of the lock end of the side bracket 202a from the subassembly 200a and the lock end of the edge bracket 204b from subassembly 200b as the edge bracket 204b pivots into place. FIG. 8b shows the assembled frame bracket 102 after the edge bracket 204b has engaged with the side bracket of 202a.

The frame bracket subassemblies 200a, 200b lock together so that the framing system is rigid and does not fall out of the ceiling. In this particular embodiment, the side bracket 202a comprises a first-type locking feature 212 such as a tab having hole, for example, which mates with a second-type locking feature 214 such as a dimple, for example, on the edge bracket 204b to secure the two subassemblies 200a, 200b together. Many other locking structures are also possible, including barbed tabs, press-in posts with self-clinching holes, and adhesives, for example.

Figure 9:
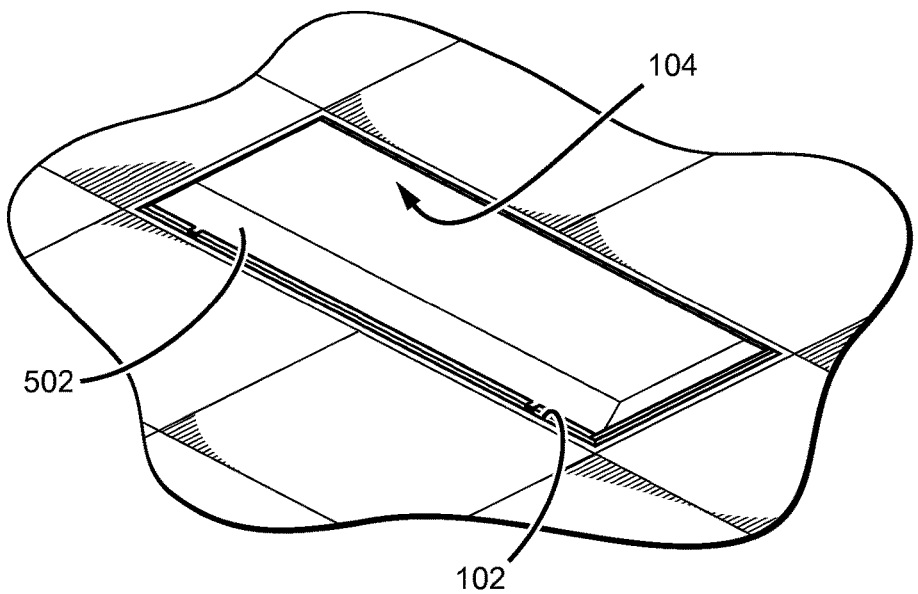
FIG. 9 is a perspective view of a frame bracket in the ceiling after subassemblies have been locked together.

FIG. 9 is a perspective view of the frame bracket 102 in the ceiling after the subassemblies 200a, 200b have been locked together, defining the frame area 104.

Figure 10A:
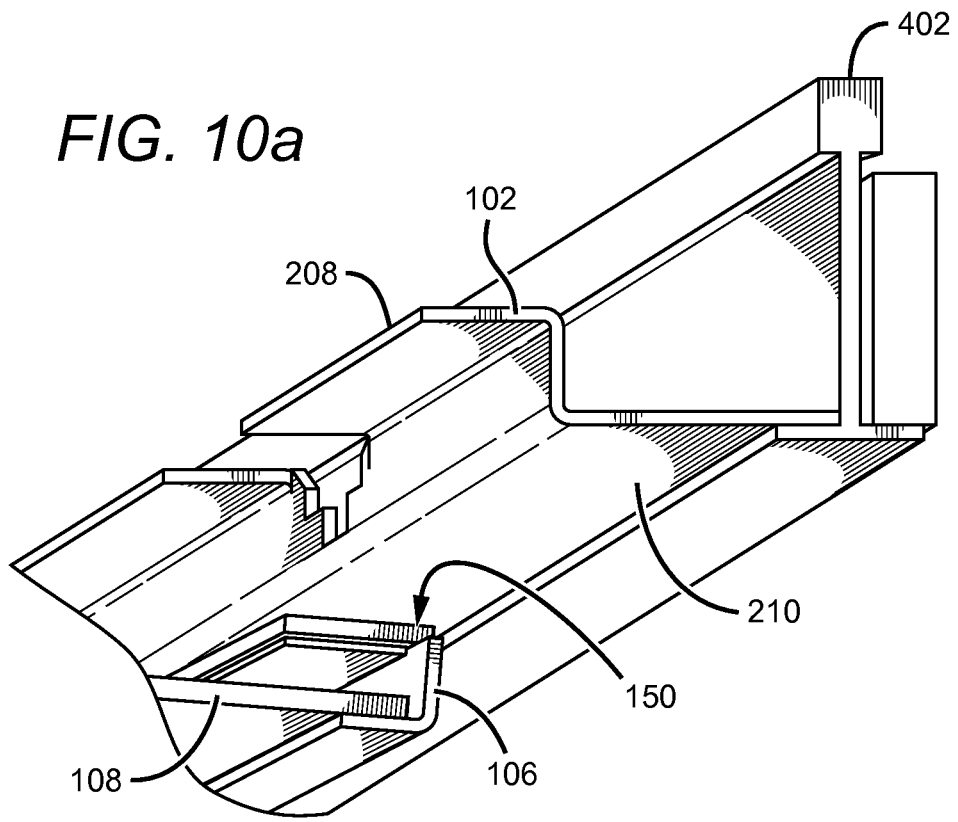
FIGS. 10a and 10b are close-up cutaway views of a frame bracket and a lens frame during attachment.
Figure 10B:
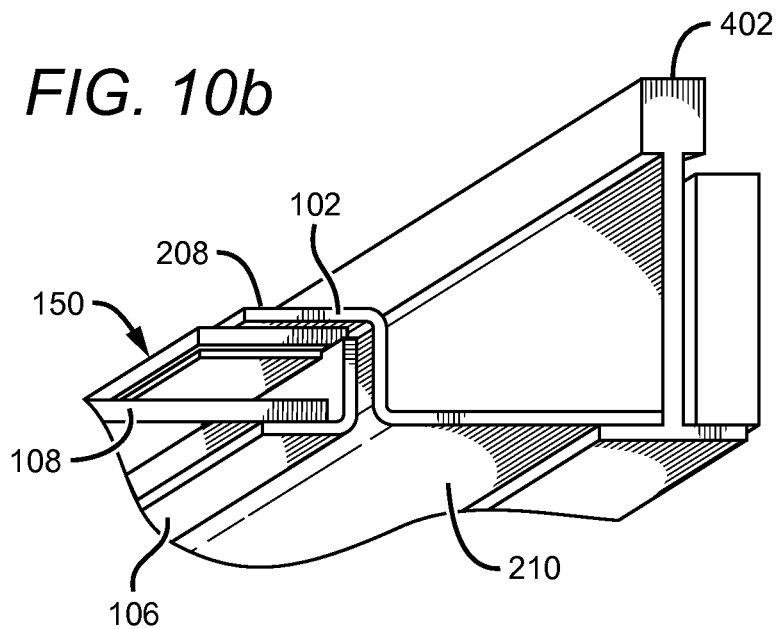

FIGS. 10a and 10b are close-up cutaway views of the frame bracket 102 and the lens frame 106 during attachment. The frame bracket 102 and the lens frame 106 may be releasably fastened using an attachment latch 150. In this particular embodiment, the attachment latch 150 comprises one or more magnets that fasten to the bottom side of the interior flange 208 of the frame bracket 102. In one embodiment, the lens frame 106 is rotatably fastened to the frame bracket 102 on a first side, allowing the lens frame 106 to swing such that a second side of the lens frame 106 can attach to the other side of the bracket frame 102 with the magnetic attachment latch 150. In another embodiment, the lens frame is attached on all sides to the frame bracket with attachment latches, such as the magnetic latches. In this case, all four sides of the lens frame 106 are pressed up against the interior flange 208 of the frame bracket 102 at substantially the same time to fasten the two together.

Figure 11A:
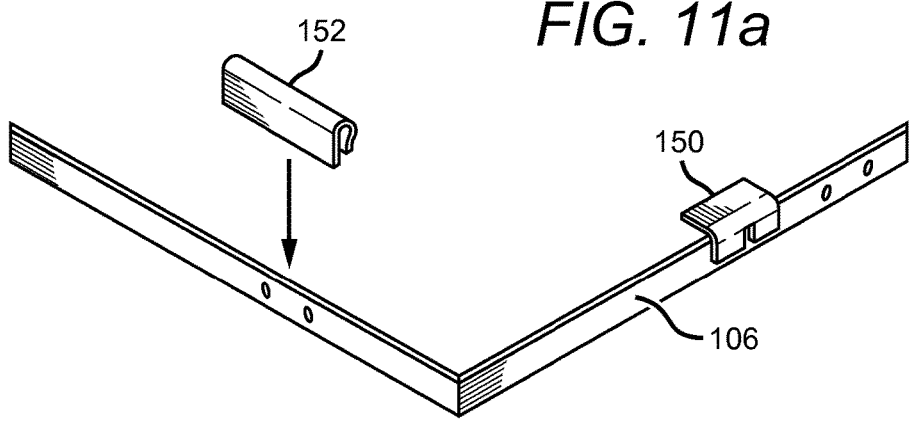
FIGS. 11a and 11b are perspective views of clips that may be used to provide a redundant attachment mechanism.
Figure 11B:
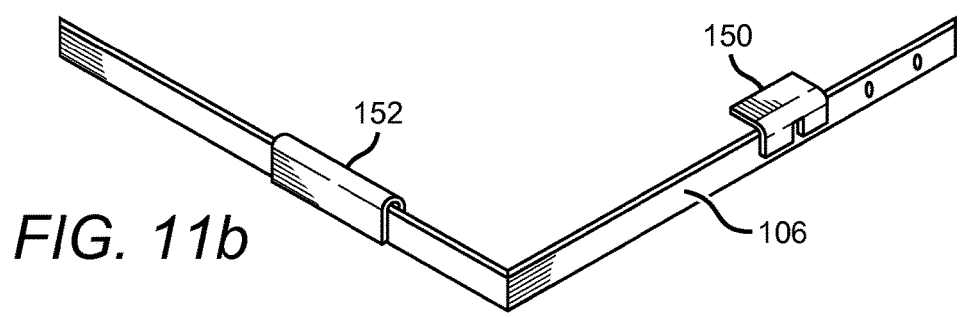
Figure 12:
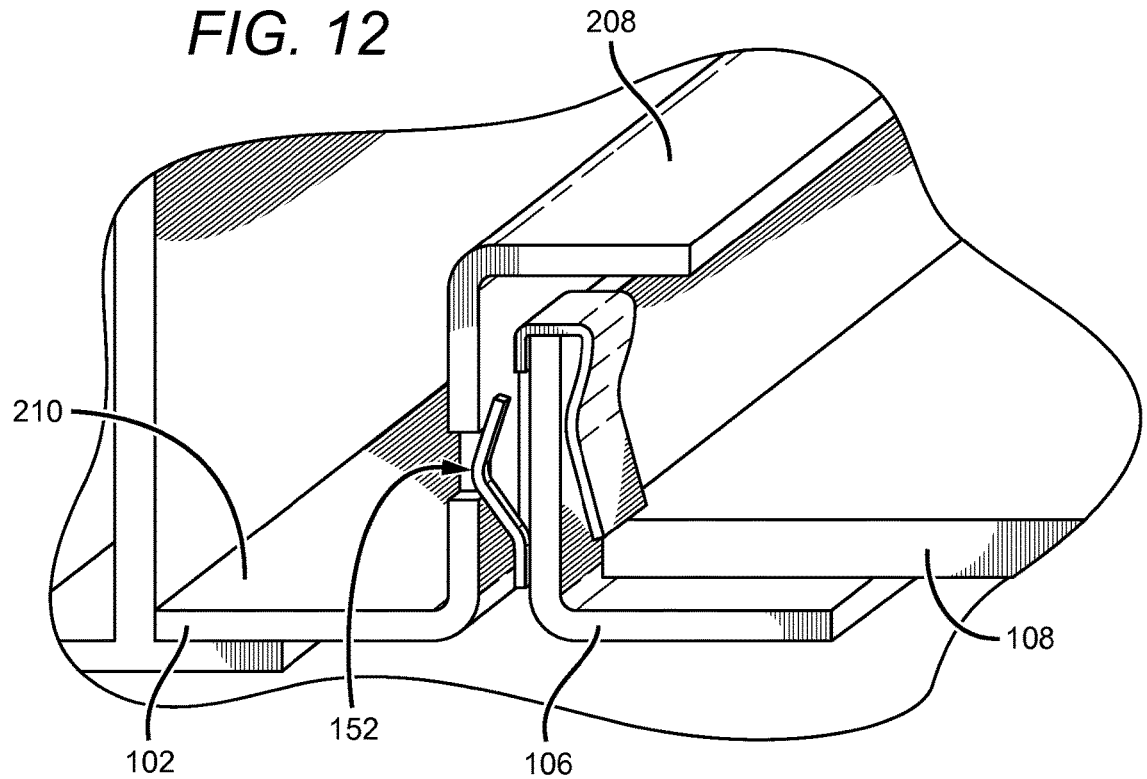
FIG. 12 is a close-up cutaway view of a frame bracket and a lens frame after assembly.

In some environments, especially those where earthquakes are frequent, when magnetic attachment latches are used it may be desirable to use additional attachment features to secure the lens frame 106 in place within the frame bracket 102. As shown in FIGS. 11a and 11b, clips 152 may be used to provide the redundant attachment mechanism. FIG. 12 shows a close-up cutaway view of the frame bracket 102 and the lens frame 106 after assembly. Here, a clip 152 clamps over the top of the lens frame 106. The clip comprises a protruding portion that releasably engages with a hole/depression in the frame bracket 102 as shown to hold the lens frame 106 firmly in place, providing the additional hold necessary for high-vibration environments. The clips 152 can be used in addition to or instead of the magnetic attachment latches 150. Many other fastener mechanisms can be used to hold the lens frame 106 within the frame bracket 102.

Figure 13:
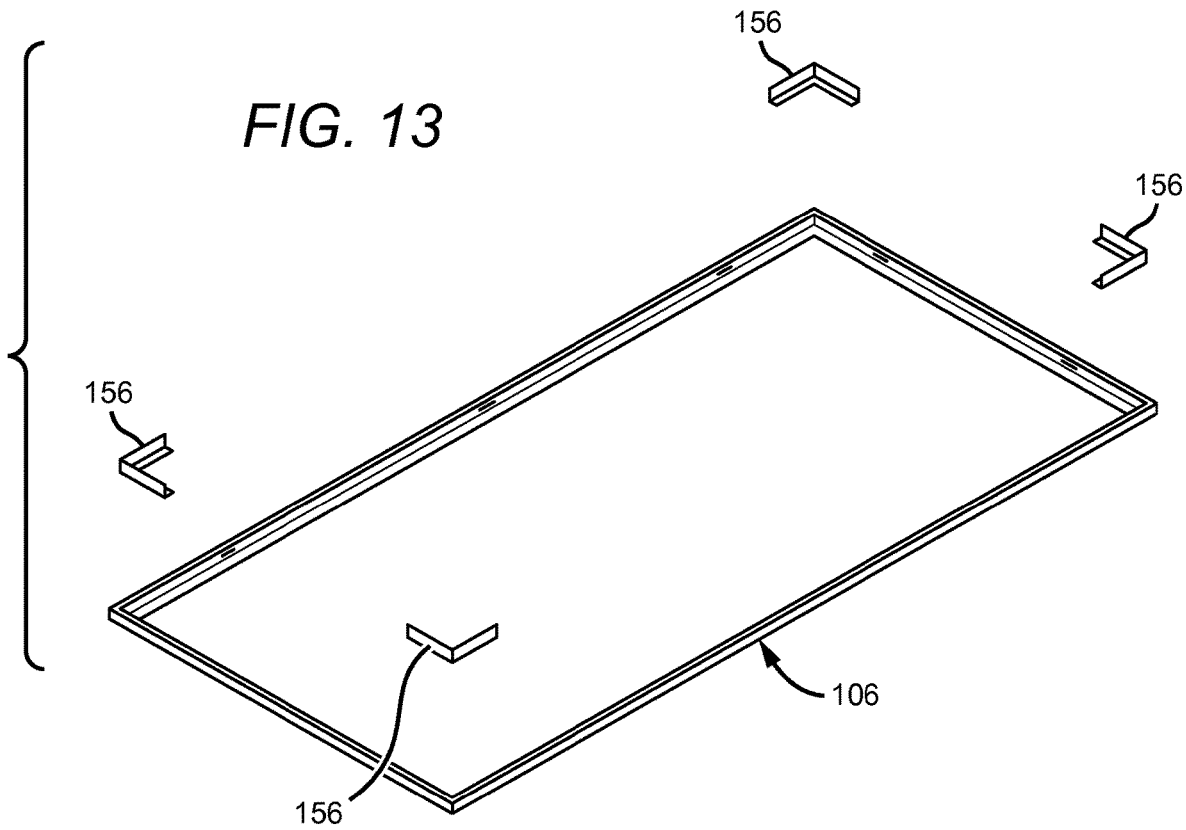
FIG. 13 is an exploded view of a lens frame that may be used in embodiments of the present invention.
Figure 14:
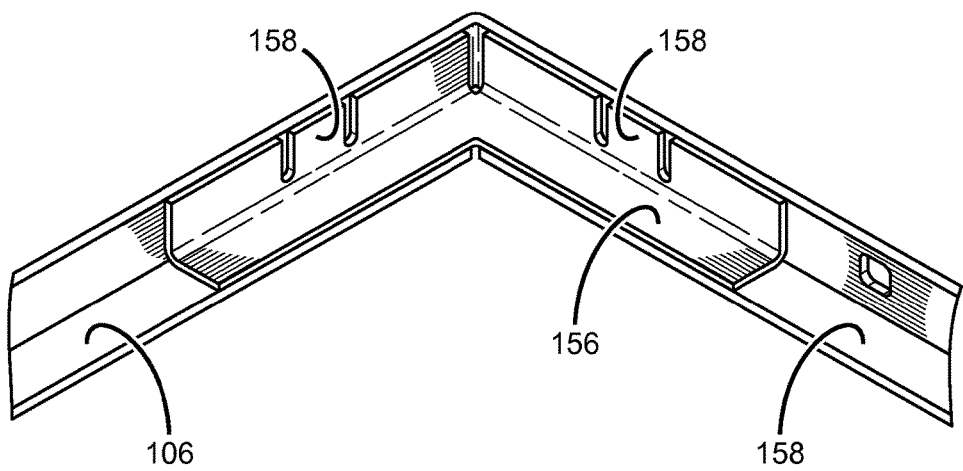
FIG. 14 is a close-up view of an interior corner of a lens frame with a corner brace.
Figure 15A:
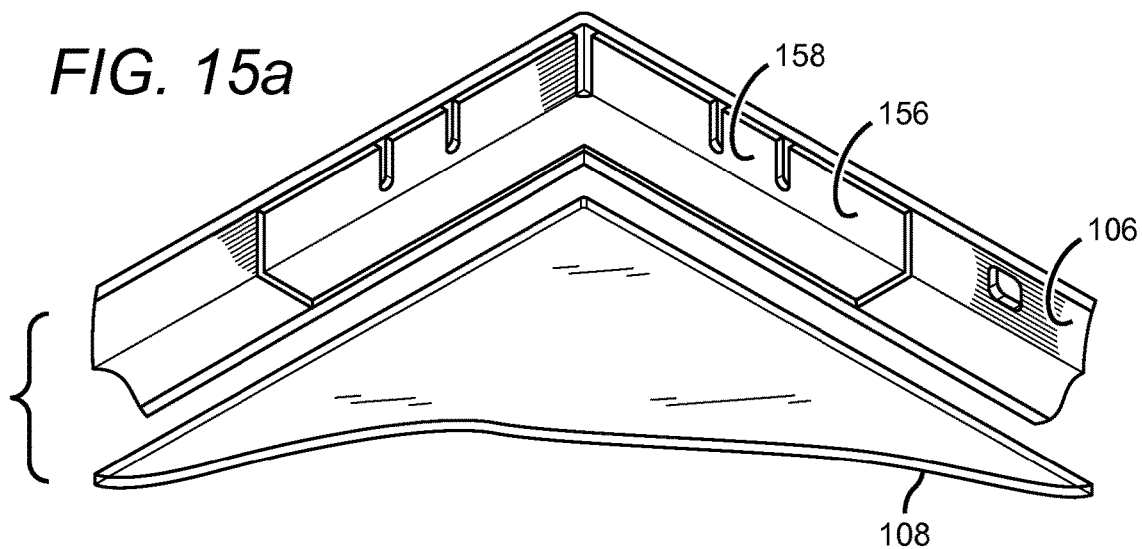
FIGS. 15a and 15b are close-up views of an interior corner of a lens frame with a corner brace.
Figure 15B:
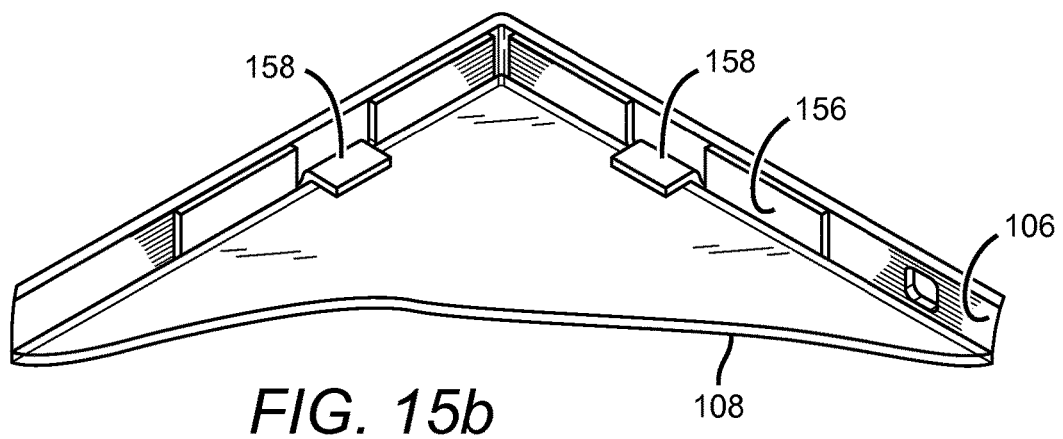

FIG. 13 shows an exploded view of a lens frame 106 that may be used in embodiments of the present invention. In some cases, the lens frame 106 may be fabricated out of a single piece of material, such as aluminum, for example. Depending on the material, the resulting lens frame 106 structure may be flimsy and prone to deformation. In order to reinforce the lens frame 106, one or more corner braces 156 may be used. The corner braces may be attached to the interior corners of the lens frame 106 using welds, tox lock techniques, or adhesives, for example. FIGS. 14, 15a and 15b are close-up views of an interior corner of the lens frame 106 with a corner brace 156 attached to a horizontal mount surface 158 and/or the vertical portion of the lens frame 106. In some embodiments, bendable tabs 158 may be formed into the corner braces 156. As shown in FIG. 15a, the lens 108 fits inside the lens frame 106 on the mount surface 158. With the lens 108 resting against the mount surface 158, the tabs 156 may be bent down to urge the lens 108 against the mount surface 158, preventing the lens 108 from sliding about the lens frame 106 as shown in FIG. 15b.

Figure 16:
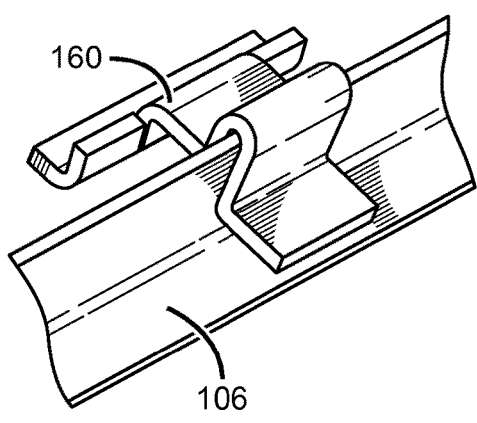
FIG. 16 is a close-up view of a rotating clip.
Figure 17:
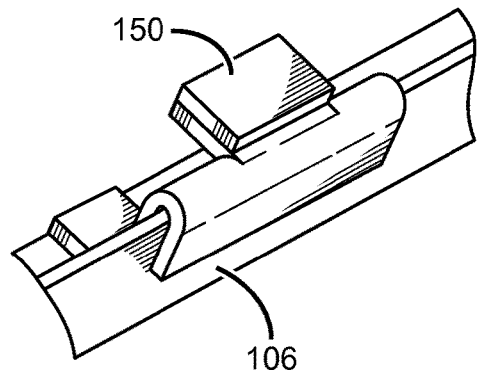
FIG. 17 is a close-up view of a magnetic attachment latch.

As previously discussed, in some embodiments, such as the lens frame system 100 shown in FIG. 1, the lens frame 106 is first rotatably connected to a first side of the frame bracket 102. FIG. 16 is a close-up view of a rotating clip 160 that may be used to fasten the first side of the lens frame 106 to the frame bracket 102, allowing the other side of the lens frame to swing up to attach with the opposite side of the frame bracket 102. FIG. 17 is a close-up view of a previously discussed magnetic attachment latch 150 for attaching the lens frame 106 to the interior flange 208 of the frame bracket 102.

Figure 18:
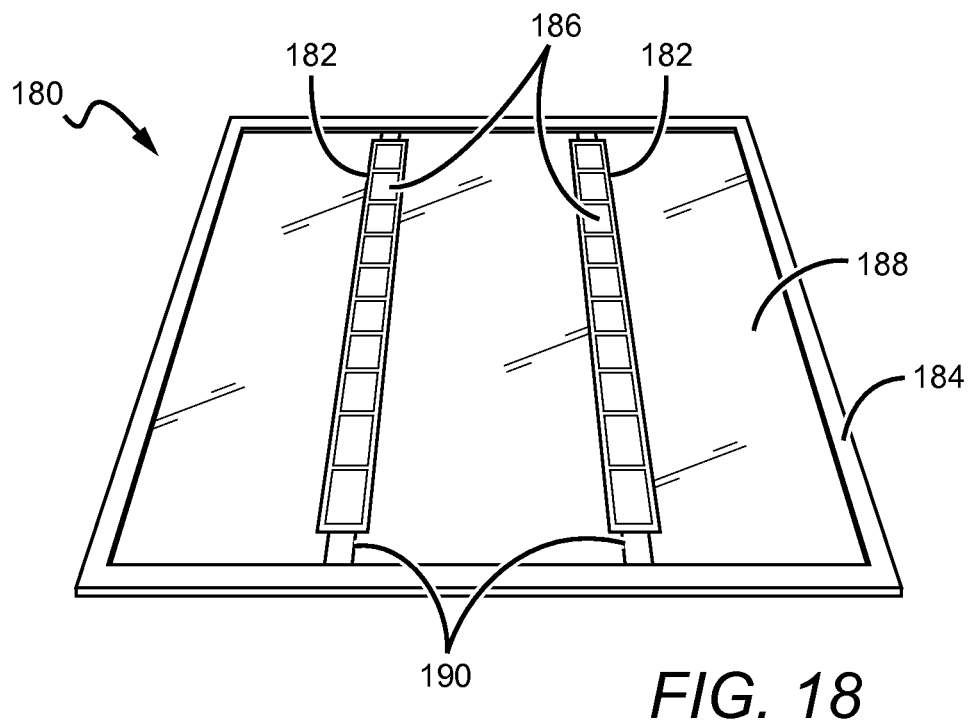
FIG. 18 is a perspective view of a lens frame assembly.

In some embodiments, it may be desirable to include a lens frame assembly that includes luminous sources. FIG. 18 is a perspective view of a lens frame assembly 180 that comprises luminous sources, such as light bars 182, already built into the lens frame body 184. Here, the light bars 182 provide an interior mount surface on which light emitters 186, such as LEDs, can be mounted. The lens frame assembly 180 is an example of an indirect source; i.e., the light from the emitters 186 is initially emitted away from an exit lens 188, requiring that the light be redirected by an internal surface back toward the exit lens 188 where it is emitted into a room environment. Wiring connections 190 can run on or through the lens frame body 184 to provide an electrical connection to the light emitters 186. Many different frame and light bar structures are possible, several of which are discussed in detail in U.S. patent application Ser. No. 13/828,348, titled "DOOR FRAME TROFFER", which is commonly owned with the present application by Cree, Inc., and incorporated by reference as if set forth fully herein.

Figure 19:
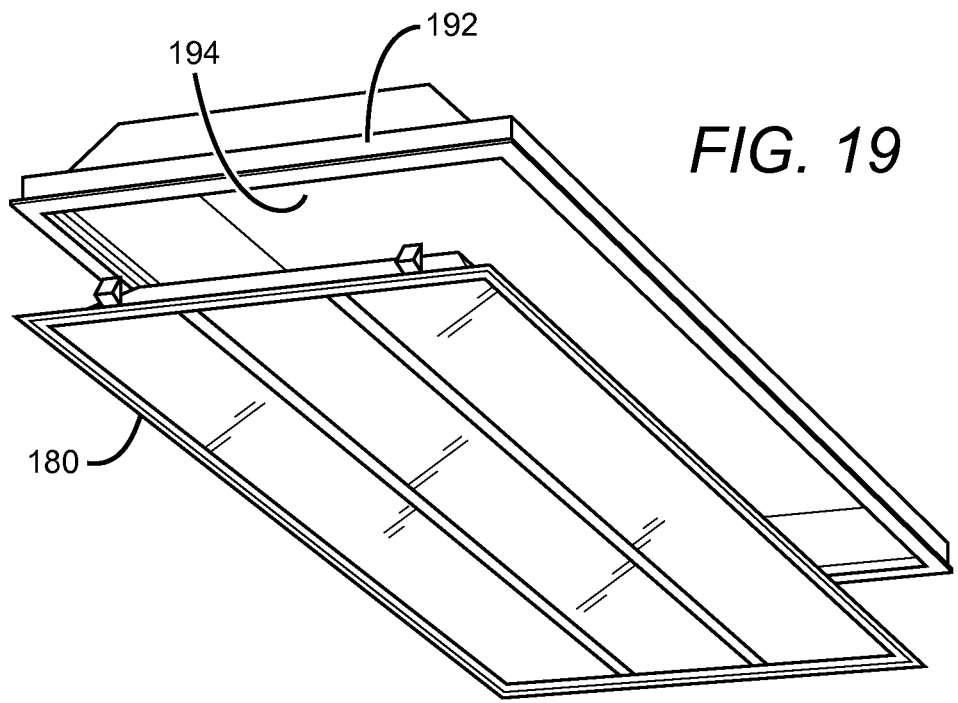
FIG. 19 is a perspective view of a lens frame assembly.

FIG. 19 is a perspective view of the lens frame assembly 180 prior to installation into a frame bracket 192. The lens frame assembly 180 and the frame bracket 192 can be attached within a pre-existing lay-in 194 similarly as the lens frame 106 and the frame bracket 102 previously disclosed herein.

Figure 20A:
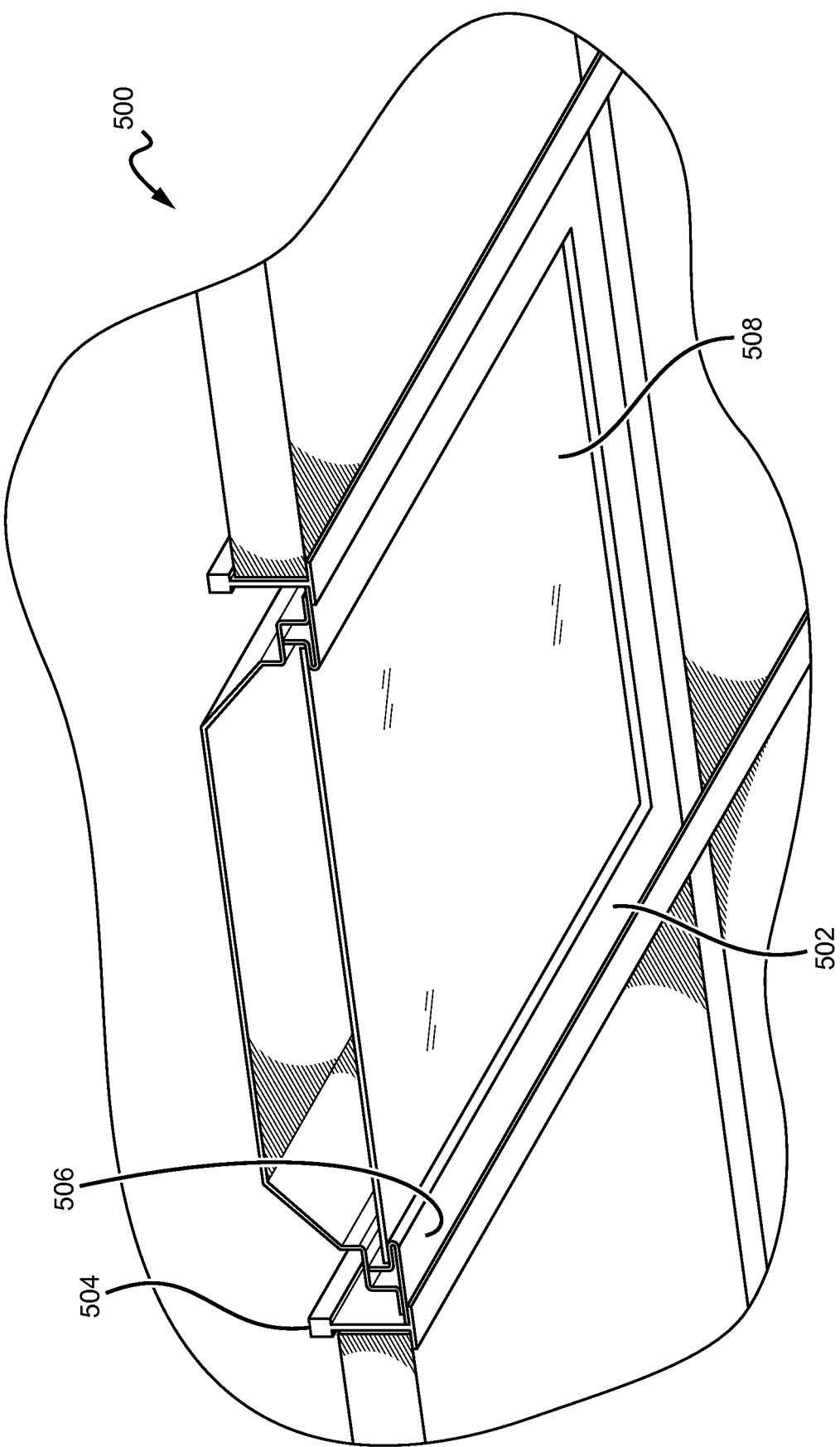
FIG. 20a is a perspective cutaway view of a lens fixture system.
Figure 20B:
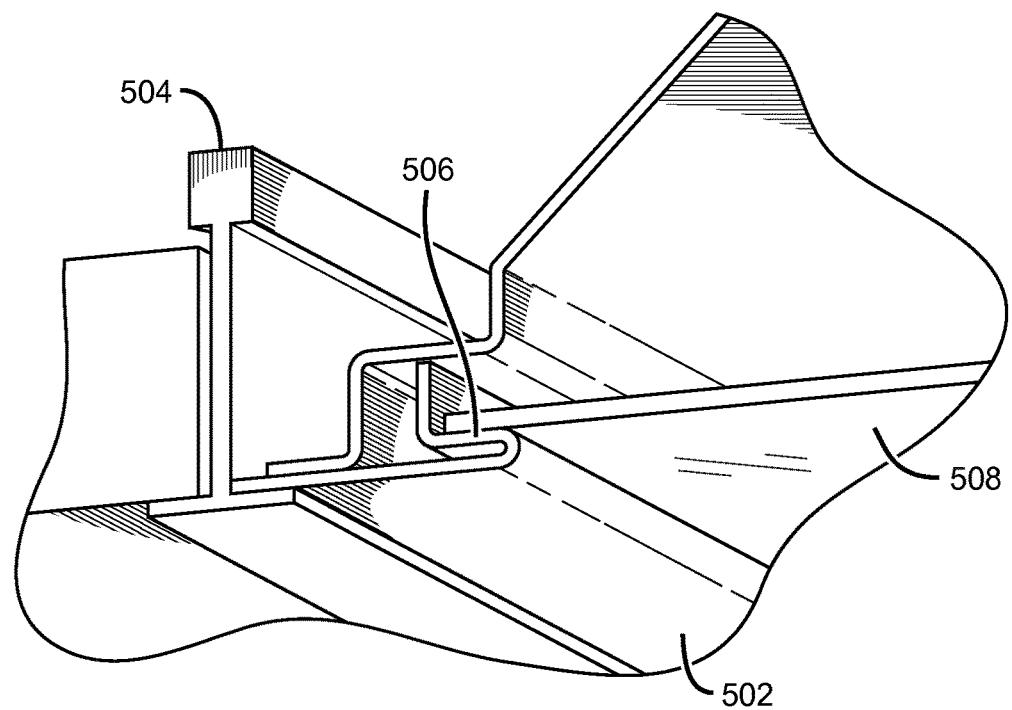
FIG. 20b is a close-up view of a portion of a lens fixture system.

FIG. 20a is a perspective cutaway view of a lens fixture system 500 according to an embodiment of the present invention. FIG. 20b is a close-up view of a portion of the lens fixture system 500. In this particular embodiment, a frame bracket 502 rests on the horizontal portion of a T-grid 504. The frame bracket 502 is constructed with an interior lens flange 506. The flange 506 provides a mount surface for a flexible lens 508. Because it is flexible, it is possible to bend the lens 508 to fit it within the frame area. Once inside the frame area, the lens 508 can relax, regain its original shape, and rest on the flange 506. Because the lens 508 is not rigid it is not necessary to pre-mount it within a lens frame, eliminating the need for a lens frame structure altogether. In other embodiments, the lens may be rigid, in which case it can be laid or slid on top of the interior lens flange during installation. The frame bracket 502 may be constructed from collapsing subassemblies similarly as the frame bracket system 100 previously disclosed herein.

Figure 21B:
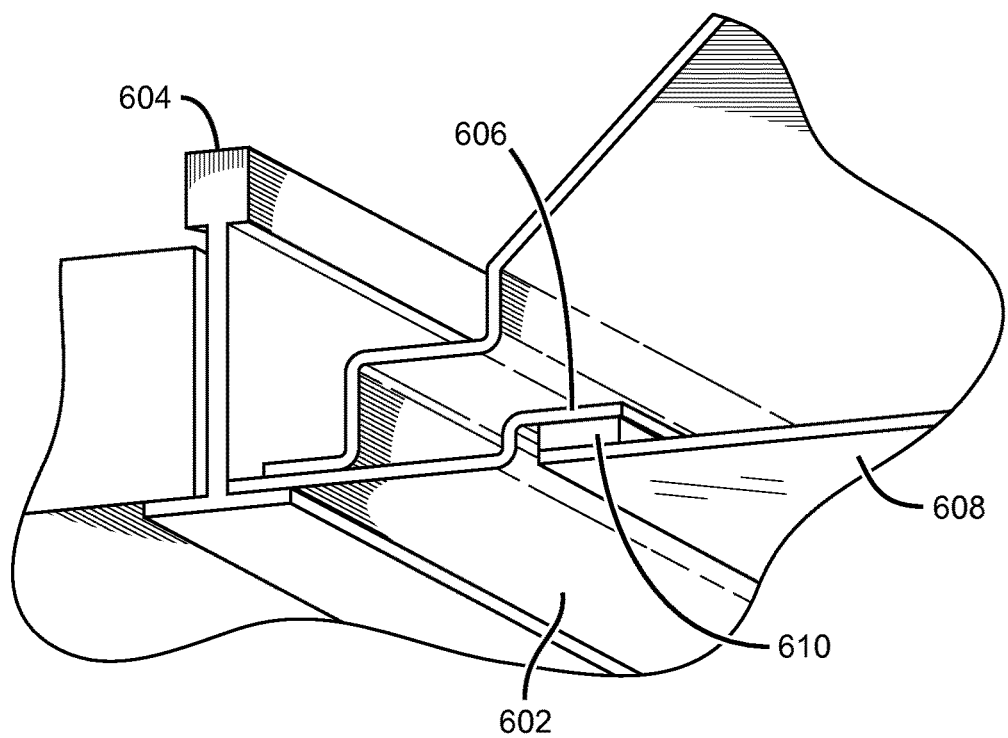
FIG. 21b is a close-up view of a portion of a lens fixture system.
Figure 21A:
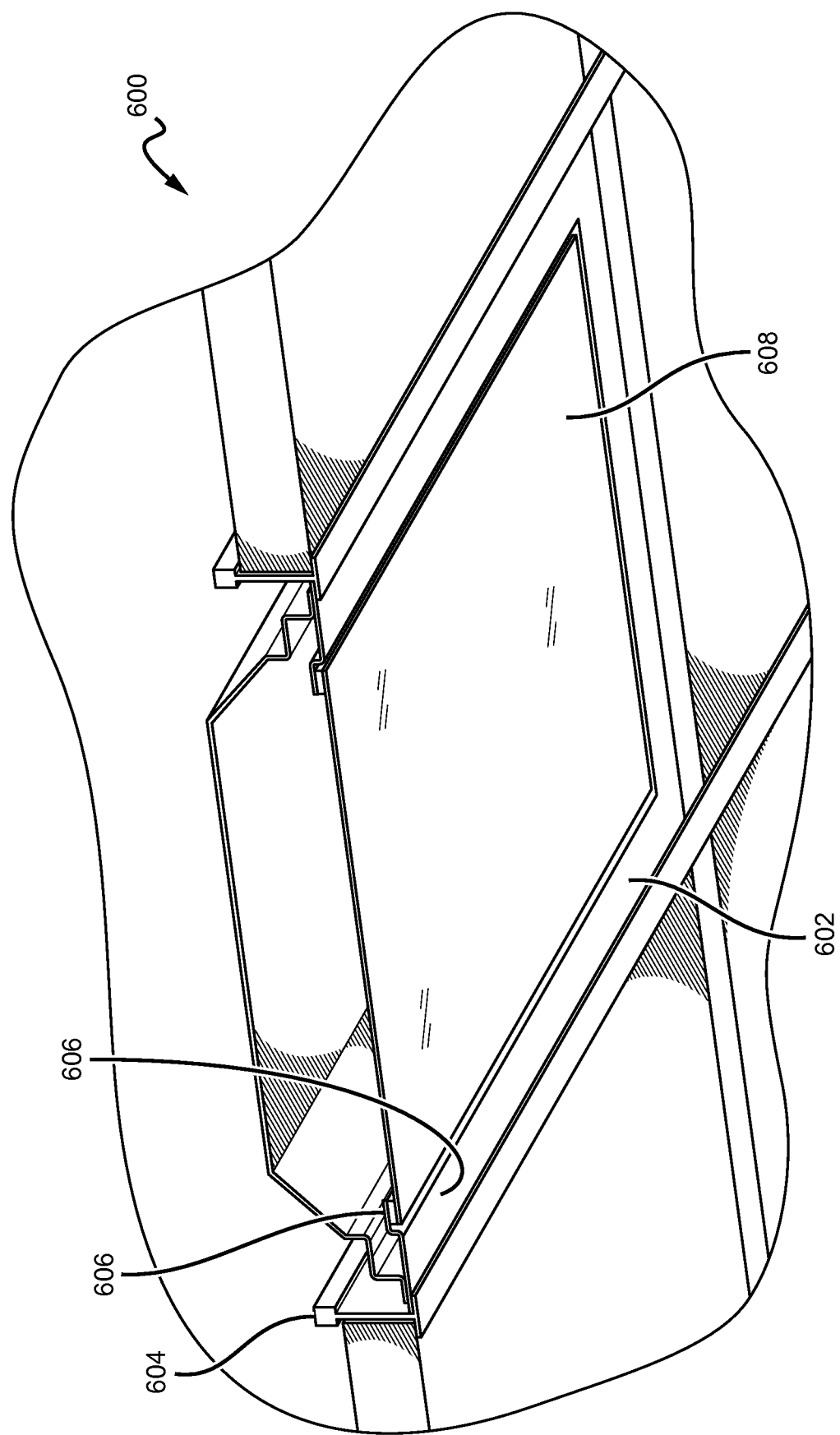
FIG. 21a is a perspective cutaway view of a lens fixture system.

FIG. 21a is a perspective cutaway view of a lens fixture system 600 according to an embodiment of the present invention. FIG. 21b is a close-up view of a portion of the lens fixture system 600. In this particular embodiment, a frame bracket 602 rests on the horizontal portion of a T-grid 604. The frame bracket 602 is constructed with an interior lens flange 606. The flange 606 provides a bottom-side mount surface for a lens 608. The frame bracket 602 and the lens 608 may be releasably fastened directly to one another using an attachment latch 610. Thus, the lens fixture system 600 does not require a lens frame. In this particular embodiment, the attachment latch 610 comprises one or more magnets that releasably fasten to the bottom side of the interior flange 606 of the frame bracket 602. The magnets are attached to the top side of the lens 608 in this embodiment. In other embodiments, magnets of opposite polarity may be attached to both the bottom side of the frame bracket and the top side of the lens for increased hold. Here, the lens 608 is attached on all sides to the frame bracket 602 with attachment latches 610, such as the magnetic latches. In this case, all four sides of the lens 608 are pressed up against the interior flange 606 of the frame bracket 602 at substantially the same time to fasten the two together. The frame bracket 602 may be constructed from collapsing subassemblies similarly as the frame bracket system 100 previously disclosed herein.

It is understood that embodiments presented herein are meant to be exemplary. The different features of the invention can be arranged in many different ways and the installation of the lens frames and lenses can be accomplished using many different elements and steps.

In some embodiments, the light source 156 can comprise a linear array of light emitting diodes (LEDs), although it is understood that other light sources can also be used. Each of the LEDs can emit light with the same characteristics, such as emission intensity, color temperature, and color rendering index. This can result in the particular fixture emitting a substantially uniform emission, with the many industrial, commercial, and residential applications calling for fixtures emitting white light.

In some embodiments, a multicolor source is used to produce the desired light emission, such as white light, and several colored light combinations can be used to yield white light. For example, as discussed in U.S. Pat. Nos. 7,213,940 and 7,768,192, both of which are assigned to Cree, Inc., and both of which are incorporated herein by reference, it is known in the art to combine light from a blue LED with wavelength-converted yellow light to yield white light with correlated color temperature (CCT) in the range between 5000K to 7000K (often designated as "cool white"). Both blue and yellow light can be generated with a blue emitter by surrounding the emitter with phosphors that are optically responsive to the blue light. When excited, the phosphors emit yellow light which then combines with the blue light to make white. In this scheme, because the blue light is emitted in a narrow spectral range it is called saturated light. The yellow light is emitted in a much broader spectral range and, thus, is called unsaturated light.

Another example of generating white light with a multicolor source comprises combining the light from green and red LEDs. RGB schemes may also be used to generate various colors of light. In some applications, an amber emitter is added for an RGBA combination. The previous combinations are exemplary; it is understood that many different color combinations may be used in embodiments of the present invention. Several of these possible color combinations are discussed in detail in U.S. Pat. No. 7,213,940 to van de Ven et al.

Other light sources can comprise series or clusters having two blue-shifted-yellow LEDs ("BSY") and a single red LED ("R"). BSY refers to a color created when blue LED light is wavelength-converted by a yellow phosphor. BSY and red light, when properly mixed, combine to yield light having a "warm white" appearance. These and other color combinations are described in detail in the previously incorporated patents to van de Ven (U.S. Pat. Nos. 7,213,940 and 7,768,192). The light sources according to the present invention can use a series of clusters having two BSY LEDs and two red LEDs that can yield a warm white output when sufficiently mixed.

The light sources can be arranged to emit relatively even emission with different luminous flux, with some embodiments having light sources that combine to emit at least 100 lumens, while other embodiments can emit at least 200 lumens. In still other embodiments the lighting sources can be arranged to emit at least 500 lumens.

In those embodiments where the light sources are included in the lens frame structure, the system can also comprise alternative mechanisms for holding the lens frame during wiring, such as tethers or lanyards, for example. These features may allow for hands-free wiring connections to the lens frame while preventing it from falling. Safety tethers and lanyards can also be included between the ceiling and the lens frame to hold the lens frame and prevent it from falling to the ground if the light engine was knocked from one or more of the attachment latches. Seismic brackets can also be included to hold the elements of the lens frame system in place in case of an earthquake.

The retrofit system can also be arranged in different ways to provide for different installation steps. The lens frame can be arranged with alternative connection points such that it pivots about its longitudinal edge. The lens frame can also be arranged so that it translates into its final position with or without being guided by mechanical links or other members, or follow any path that combines rotation and translation, rather than pivoting about a fixed axis.

In other alternative embodiments, the final wiring connections to the lens frame can be made after it is in its final position, with the connections being made through a port or door. The wiring can also be enclosed in a flame-rated conduit "whip" to provide a fire barrier for the wiring. This can allow for the use of non-flame rated materials.

It is understood that many different mounting frames can be used, some of which can comprise more or fewer pieces than those described above. Some alternative embodiments can comprise one, two or three piece arrangements. It is also understood that the present invention can be used in different sized troffer pans and ceiling T-grids, and can be used with different sized lens frames. Application of similar mounting features can also allow for a lens frame to be quickly and easily installed into a surface mount fixture.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

We claim:

1. A system, comprising:
  a frame bracket comprising first and second frame bracket subassemblies, each of said first and second frame bracket subassemblies comprising:
    a side bracket and an edge bracket, each comprising a pivot end and a lock end, said pivot ends rotatably joined at a pivot, said side bracket lock end comprising a first-type locking feature, said edge bracket lock end comprising a second-type locking feature, said side bracket and edge bracket defining an interior flange and an exterior flange extending opposite said interior flange; and
  a lens;
  wherein said side bracket lock end of said first subassembly releasably locks together with said edge bracket lock end of said second subassembly to define a frame area, said lens sized to fit within said frame area;
  wherein said lens is held in place within said frame area by said frame bracket; and
  wherein said lens is on said interior flange.

2. The system of claim 1, wherein said lens rests on a top side surface of said interior flange.

3. The system of claim 1, further comprising an attachment latch that releasably fastens said lens to said frame bracket.

4. The system of claim 3, said attachment latch comprising a plurality of magnets on said lens that are releasably attachable to a bottom surface of said interior flange.

* * * * *